(12) United States Patent
Wang et al.

(10) Patent No.: US 12,175,597 B1
(45) Date of Patent: Dec. 24, 2024

(54) SYSTEMS AND METHODS FOR ARRANGING CLOTHING PATTERNS

(71) Applicant: ZHEJIANG LINGDI DIGITAL TECHNOLOGY CO., LTD., Zhejiang (CN)

(72) Inventors: Huamin Wang, Hangzhou (CN); Chen Liu, Hangzhou (CN)

(73) Assignee: ZHEJIANG LINGDI DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/621,064

(22) Filed: Mar. 28, 2024

(51) Int. Cl.
*G06T 17/00* (2006.01)
*G06T 3/02* (2024.01)
*G06V 10/44* (2022.01)

(52) U.S. Cl.
CPC .............. *G06T 17/00* (2013.01); *G06T 3/02* (2024.01); *G06V 10/44* (2022.01)

(58) Field of Classification Search
CPC ............ G06T 17/00; G06T 3/02; G06V 10/44
See application file for complete search history.

(56) References Cited

U.S. PATENT DOCUMENTS

| | | | |
|---|---|---|---|
| 2020/0027155 A1* | 1/2020 | Frakes | G06Q 30/06 |
| 2021/0012569 A1* | 1/2021 | Oh | G06T 17/205 |
| 2023/0306699 A1* | 9/2023 | Liang | A41H 3/007 |

* cited by examiner

*Primary Examiner* — Weiming He
(74) *Attorney, Agent, or Firm* — METIS IP LLC

(57) ABSTRACT

A method for arranging clothing patterns implemented on a computing device is provided. The method comprise: determining sewing relationships between clothing patterns to be transformed into a digital garment on a 3D avatar; performing iterations to process the clothing patterns, each of the iterations comprising: selecting one or more clothing patterns to be processed in the iteration from the clothing patterns based on the sewing relationships; and arranging the one or more clothing patterns to warp around the 3D avatar; and generating the digital garment that is worn on the 3D avatar by sewing the arranged clothing patterns corresponding to the iterations based on the sewing relationships.

19 Claims, 11 Drawing Sheets

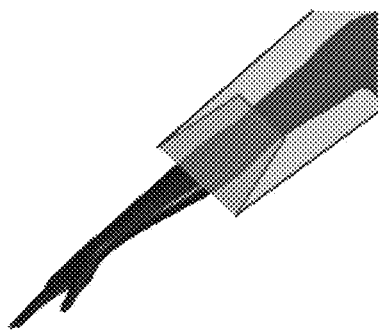
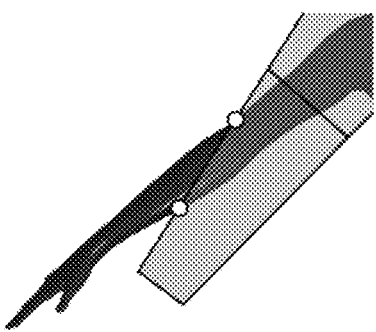
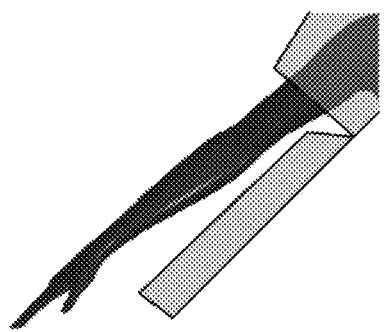
FIG. 2a  FIG. 2b  FIG. 2c
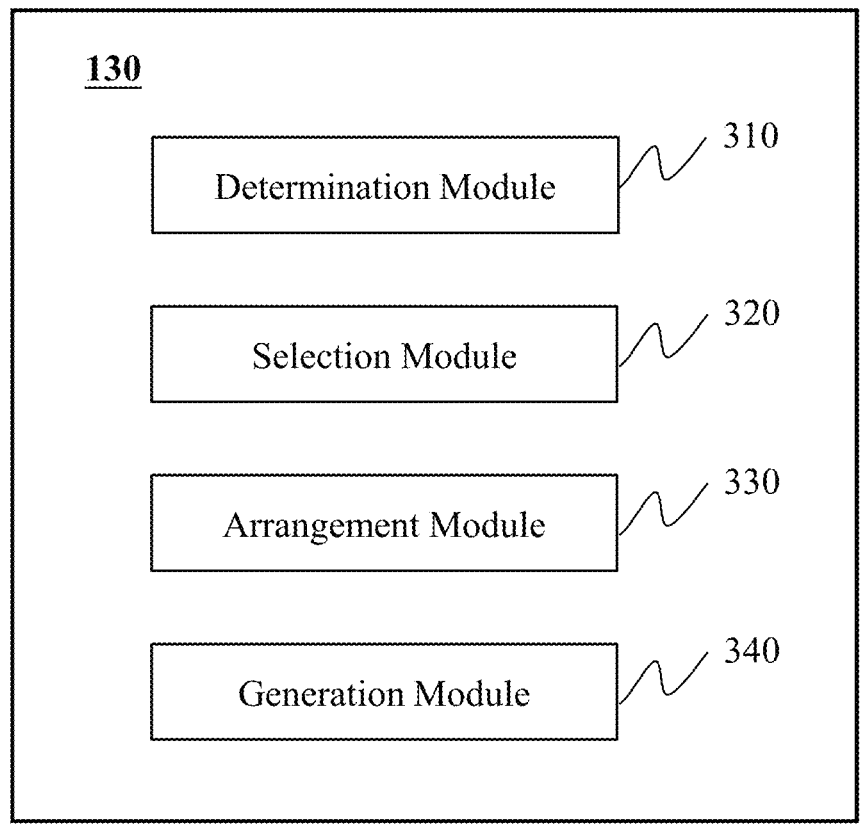
FIG. 3

SYSTEMS AND METHODS FOR ARRANGING CLOTHING PATTERNS

TECHNICAL FIELD

The present disclosure relates to the field of fashion design, and in particular, to systems and methods for arranging clothing patterns in digital garment initialization.

BACKGROUND

Clothing design technology via computer software typically involves generating a digital garment by arranging clothing patterns on a three-dimensional (3D) avatar (e.g., a 3D human body model). The clothing design technology is highly efficient and brings great convenience to users, so it has been widely used in various areas. As a representative application, a professional fashion designer can design clothing via the computer software. As another representative application, the computer software can provide a user-oriented clothing service using digital garments, which enables a user to try on clothes on-line or customize clothes.

SUMMARY

A method for arranging clothing patterns implemented on a computing device is provided. The method comprise: determining sewing relationships between clothing patterns to be transformed into a digital garment on a 3D avatar; performing iterations to process the clothing patterns, each of the iterations comprising: selecting one or more clothing patterns to be processed in the iteration from the clothing patterns based on the sewing relationships; and arranging the one or more clothing patterns to warp around the 3D avatar; and generating the digital garment that is worn on the 3D avatar by sewing the arranged clothing patterns corresponding to the iterations based on the sewing relationships.

In some embodiments, in the first iteration of the iterations, the one or more clothing patterns to be processed are determined by: for each of the clothing patterns, determining a body part corresponding to the clothing pattern based on the sewing relationships of the clothing pattern; and determining the one or more clothing patterns from the clothing patterns based on the body part corresponding to each of the clothing patterns.

In some embodiments, for each of the clothing patterns, the determining a body part corresponding to the clothing pattern based on the sewing relationships of the clothing pattern comprises: for each of the clothing pattern, determining position feature information relating to the position of the clothing pattern relative to its neighboring clothing pattern based on the sewing relationship between the clothing pattern and its neighboring clothing pattern; and determining the body part corresponding to the clothing pattern by processing the position feature information using a body part determination model, the body part determination model being a trained machine learning model.

In some embodiments, in an iteration other than the first iteration of the iterations, the one or more clothing patterns to be processed are determined by: determining, from the clothing patterns, one or more first clothing patterns that have been processed and second clothing patterns that have not been processed; for each second clothing pattern, determining a recommendation score of the second clothing pattern based on the sewing relationships between the second clothing pattern and the one or more first clothing patterns; and determining the one or more clothing patterns from the second clothing patterns based on the recommendation score of each second clothing pattern.

In some embodiments, the determining the one or more clothing patterns from the one or more second clothing patterns based on the recommendation score of each second clothing pattern comprises: selecting target clothing patterns from the second clothing patterns, each target clothing pattern having a recommendation score higher than a score threshold, and the total number of vertices of the target clothing patterns being smaller than a number threshold; and designating the target clothing patterns as the one or more clothing patterns.

In some embodiments, in an iteration other than the first iteration of the iterations, the one or more clothing patterns to be processed are determined by: determining, from the clothing patterns, one or more first clothing patterns that have been processed and second clothing patterns that have not been processed; determining one or more pattern sets based on the sewing relationships between the second clothing patterns and the one or more first clothing patterns, each pattern set including second clothing patterns whose sewing boundaries are connected on the one or more first clothing patterns; and determining the one or more clothing patterns based on the one or more pattern sets.

In some embodiments, in an iteration other than the first iteration of the iterations, the arranging the one or more clothing patterns to warp around the 3D avatar comprises: aligning the one or more clothing patterns to one or more first clothing patterns that have been processed based on the sewing relationships between the one or more clothing patterns and the one or more first clothing patterns; performing intersection removal on the one or more aligned clothing patterns to determine one or more refined clothing patterns; and determining the one or more arranged clothing patterns based on the one or more refined clothing patterns.

In some embodiments, the aligning the one or more clothing patterns to one or more first clothing patterns that have been processed comprises: determining one or more sewing pairs based on the sewing relationships between the one or more clothing patterns and the one or more first clothing patterns, each sewing pair including a first vertex of the one or more clothing patterns and a corresponding second vertex of the one or more first clothing patterns; determining one or more transformed clothing patterns by applying, based on an arranged position of the second vertex of each sewing pair, affine transformation on the one or more clothing patterns to minimize a sewing gap between the one or more clothing patterns and the one or more first clothing patterns; determining the one or more aligned clothing patterns by solving a target optimization function based on the arranged position of the second vertex of each sewing pair and the one or more transformed clothing patterns.

In some embodiments, the performing intersection removal includes removing cloth-body intersection between the one or more aligned clothing patterns and the 3D avatar by: dividing vertices of the one or more aligned clothing patterns into multiple sets based on positions of the vertices relative to a sewing boundary of the one or more aligned clothing patterns; sequentially processing the multiple sets by solving a first updated optimization function, the first updated optimization function including the target optimization function and a first optimization term relating to distances between vertices and the 3D avatar.

In some embodiments, wherein the performing intersection removal includes removing self-intersection of the one or more aligned clothing patterns by: for each vertex of the one or more aligned clothing patterns, determining a reference triangle including vertices of the one or more first clothing patterns; removing self-intersection of the one or more aligned clothing patterns by solving a second updated optimization function, the second updated optimization function including the target optimization function and a second optimization term relating to a position of each vertex of the one or more aligned clothing patterns relative to its reference triangle.

In some embodiments, wherein the determining the one or more arranged clothing patterns based on the one or more refined clothing patterns comprises: determining whether the one or more refined clothing patterns satisfy at least one termination condition; in response to determining that the one or more refined clothing patterns satisfy the at least one termination condition, designating the one or more refined clothing patterns as the one or more arranged clothing patterns; or in response to determining that the one or more refined clothing patterns do not satisfy the at least one termination condition, rearranging the one or more clothing patterns or updating the one or more clothing patterns processed in the iteration.

A method for arranging clothing patterns implemented on a computing device is provided. The method comprises determining sewing relationships between one or more first clothing patterns and one or more clothing patterns, wherein the one or more first clothing patterns have been arranged on a 3D avatar, and the one or more clothing patterns need to be arranged on the 3D avatar; aligning the one or more clothing patterns to the one or more first clothing patterns based on the sewing relationships to generate one or more aligned clothing patterns; performing intersection removal on the one or more aligned clothing patterns to determine one or more refined clothing patterns; and arranging the one or more clothing patterns to warp around the 3D avatar based on the one or more refined clothing patterns.

In some embodiments, the aligning the one or more clothing patterns to one or more first clothing patterns comprises: determining one or more sewing pairs based on the sewing relationships between the one or more clothing patterns and the one or more first clothing patterns, each sewing pair including a first vertex of the one or more clothing patterns and a corresponding second vertex of the one or more first clothing patterns; determining one or more transformed clothing patterns by applying, based on an arranged position of the second vertex of each sewing pair, affine transformation on the one or more clothing patterns to minimize a sewing gap between the one or more clothing patterns and the one or more first clothing patterns; determining the one or more aligned clothing patterns by solving a target optimization function based on the arranged position of the second vertex of each sewing pair and the one or more transformed clothing patterns.

In some embodiments, the performing intersection removal includes removing cloth-body intersection between the one or more aligned clothing patterns and the 3D avatar by: dividing vertices of the one or more aligned clothing patterns into multiple sets based on positions of the vertices relative to a sewing boundary of the one or more aligned clothing patterns; sequentially processing the multiple sets by solving a first updated optimization function, the first updated optimization function including the target optimization function and a first optimization term relating to distances between vertices and the 3D avatar.

In some embodiments, the performing intersection removal includes removing self-intersection of the one or more aligned clothing patterns by: for each vertex of the one or more aligned clothing patterns, determining a reference triangle including vertices of the one or more first clothing patterns; removing self-intersection of the one or more aligned clothing patterns by solving a second updated optimization function, the second updated optimization function including the target optimization function and a second optimization term relating to a position of each vertex of the one or more aligned clothing patterns relative to its reference triangle.

In some embodiments, the arranging the one or more clothing patterns to warp around the 3D avatar based on the one or more refined clothing patterns comprises: determining whether the one or more refined clothing patterns satisfy at least one termination condition; in response to determining that the one or more refined clothing patterns satisfy the at least one termination condition, designating the one or more refined clothing patterns as the one or more arranged clothing patterns; or in response to determining that the one or more refined clothing patterns do not satisfy the at least one termination condition, rearranging the one or more clothing patterns or updating the one or more clothing patterns.

In some embodiments, the one or more clothing patterns are selected from multiple clothing patterns to be transformed into a digital garment on the 3D avatar by: determining, from the clothing patterns, the one or more first clothing patterns that have been processed and second clothing patterns that have not been processed; for each second clothing pattern, determining a recommendation score of the second clothing pattern based on the sewing relationships between the second clothing pattern and the one or more first clothing patterns; and determining the one or more clothing patterns from the second clothing patterns based on the recommendation score of each second clothing pattern.

In some embodiments, the determining the one or more clothing patterns from the one or more second clothing patterns based on the recommendation score of each second clothing pattern comprises: selecting target clothing patterns from the second clothing patterns, each target clothing pattern having a recommendation score higher than a score threshold, and the total number of vertices of the target clothing patterns being smaller than a number threshold; and designating the target clothing patterns as the one or more clothing patterns.

In some embodiments, the one or more clothing patterns are selected from multiple clothing patterns to be transformed into a digital garment on the 3D avatar by: determining, from the clothing patterns, the one or more first clothing patterns that have been processed and second clothing patterns that have not been processed; determining one or more pattern sets based on the sewing relationships between the second clothing patterns and the one or more first clothing patterns, each pattern set including second clothing patterns whose sewing boundaries are connected on the one or more first clothing patterns; and determining the one or more clothing patterns based on the one or more pattern sets.

A system is provided. The system comprises at least one storage device storing a set of instructions for arranging clothing patterns, and at least one processor configured to communicate with the at least one storage device. When executing the set of instructions, the at least one processor is configured to direct the system to perform operations including: determining sewing relationships between clothing patterns to be transformed into a digital garment on a 3D avatar; performing iterations to process the clothing patterns, each of the iterations comprising: selecting one or more clothing patterns to be processed in the iteration from the clothing patterns based on the sewing relationships; and arranging the one or more clothing patterns to warp around the 3D avatar; and generating the digital garment that is worn on the 3D avatar by sewing the arranged clothing patterns corresponding to the iterations based on the sewing relationships.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 2a-2c are schematic diagrams illustrating exemplary artifacts according to some embodiments of the present disclosure;

FIG. 3 is a block diagram illustrating an exemplary processing device according to some embodiments of the present disclosure;

DETAILED DESCRIPTION

Figure 1:
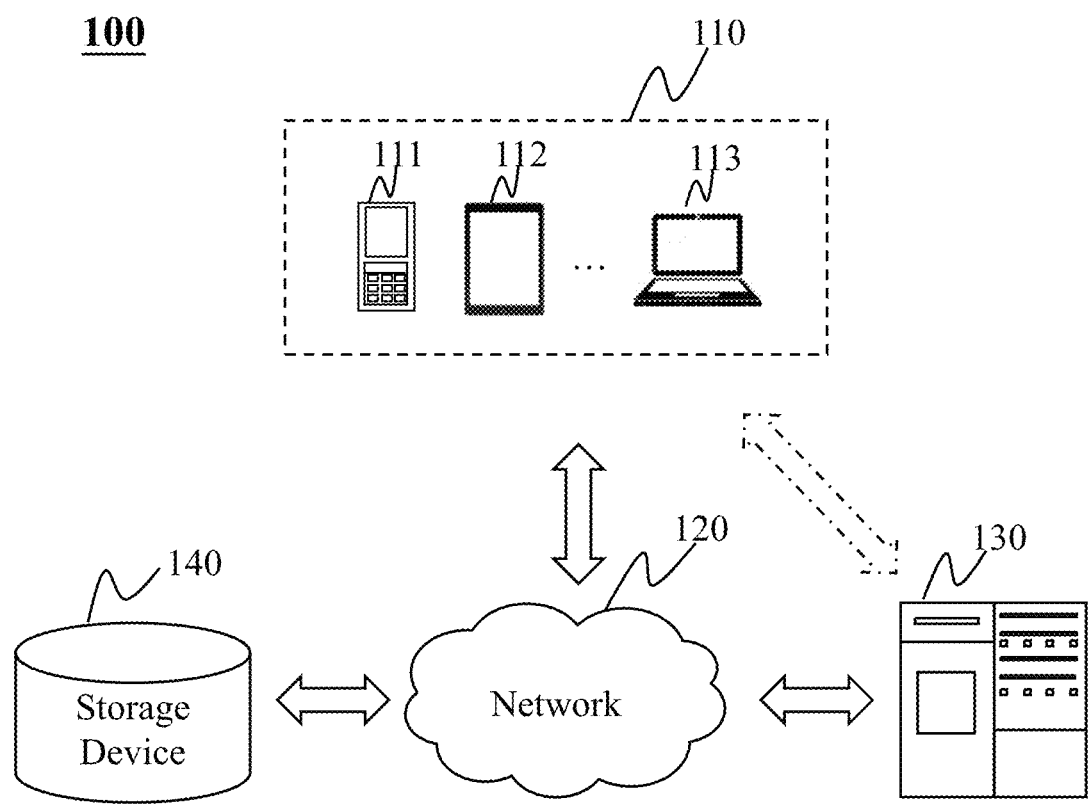
FIG. 1 is a schematic diagram illustrating an exemplary fashion design system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that, although the terms "first," "second," "third," "fourth," etc., may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections or assemblies of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/ blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

With the rise of digital fashion businesses and the progress in generative AI models, digital clothing patterns have become more accessible and affordable. This advancement raises an intriguing question: how to convert digital clothing patterns to well-fitted digital garments on 3D avatars effortlessly and automatically? This capability is in high demand for a range of digital fashion and entertainment applications, as it forms a key component in the automated creation of 3D garments and characters.

Unfortunately, when presented with a clothing pattern and its sewing relationships, cloth simulation often grapples with non-uniqueness, resulting in visual artifacts primarily due to local minima. These artifacts can manifest as self-intersection in FIG. 2a, cloth-body intersection in FIG. 2b, or misplaced clothing patterns stuck outside of the body in FIG. 2c, depending on how the simulation objective is defined and optimized. The self-intersection refers to that a clothing pattern is folded or multiple clothing patterns are intersected with each other. The cloth-body intersection refers to that a clothing pattern intersects with the 3D avatar and does not warp around the 3D avatar. To mitigate the local minima issue, a natural solution is to employ a suitable initialization. In essence, the goal of an initialization is to position the clothing patterns around the 3D avatar without folding or intersection, thus enabling the generation of visually acceptable digital garments through simulation. An intersection-free initialization is also important to simulators that rely on continuous collision detection and interior point methods.

While researchers have long acknowledged the challenge of addressing local minima in simulation, their primary focus has traditionally revolved around mitigating numerical instability. In this pursuit, the complexities of establishing a suitable initialization have often been overshadowed. A relatively straightforward aspect of garment initialization involves the assignment of clothing patterns to body parts. Such assignments can be automatically extracted from pattern shapes and labels, or manually determined by users. However, a more complex issue emerges when trying to establish the suitable initial shape for each clothing pattern without folding or intersection. While simply projecting a clothing pattern onto a pre-defined planar or cylindrical surface is adequate for basic garments, it is impractical and demands significant manual intervention when dealing with complex garments featuring small clothing patterns, multiple layers, or asymmetric sewing configurations like shirring. Such manual intervention disrupts the smooth, automated workflow for generating digital garments in an unsupervised manner.

Assuming a digital garment is provided with the clothing patterns and all sewing relationships, the present disclosure provides automatic initialization systems and methods to tackle or reduce the local minima issue in subsequent simulations. Specifically, after the sewing relationships between clothing patterns (or referred to as clothing pieces) are determined, iterations may be performed to process the clothing patterns. In each iteration, at least one clothing pattern to be processed in the iteration may be selected from the clothing patterns based on the sewing relationships, and the at least one clothing pattern may be arranged to warp around the 3D avatar. After all the clothing patterns are processed, the digital garment that is worn on the 3D avatar may be generated by sewing the arranged clothing patterns corresponding to the iterations based on the sewing relationships.

The systems and methods disclosed herein are founded on a phased approach, gradually introducing clothing patterns and objective potentials into an optimization-based initialization procedure. This phased approach not only addresses the local minima but also offers unique advantages. It achieves high efficiency by optimizing only a small set of clothing patterns at a time. It conveniently resolves inter-piece intersections based on the order of clothing pattern arrangement. It is user-friendly and allows user intervention whenever necessary, especially if the pattern selection result is imperfect.

FIG. 1 is a schematic diagram illustrating an exemplary fashion design system 100 according to some embodiments of the present disclosure. As shown in FIG. 1, the fashion design system 100 may include a user terminal 110, a network 120, a processing device 130, and a storage device 140. In some embodiments, the user terminal 110, the processing device 130, and/or the storage device 140 may be connected to and/or communicate with each other via a wireless connection (e.g., the network 120), a wired connection, or a combination thereof. The connection between the components of the fashion design system 100 may be variable.

The user terminal 110 may enable user interaction between a user and the fashion design system 100. For example, the user terminal 110 may receive user instructions input by the user (e.g., a user instruction for selecting a seed clothing pattern). As another example, the user terminal 110 may display information relating to the fashion design system 100 to the user. For example, the user terminal 110 may display clothing patterns for user selection, a 3D avatar, a 3D clothing pattern wrapped around the 3D avatar, a parameter setting element for setting related parameters, a digital garment, or the like, or any combination thereof.

In some embodiments, the user terminal 110 may include a mobile device 111, a tablet computer 112, a laptop computer 113, or the like, or any combination thereof. In some embodiments, the user terminal 110 may include input/output components, such as a display. Exemplary displays may include a liquid crystal display (LCD), a light emitting diode (LED)-based display, a flat panel display or curved screen (or television), a cathode ray tube (CRT), a virtual reality device, an augmented reality device, or the like, or a combination thereof. In some embodiments, the user terminal 110 may be part of the processing device 130.

The network 120 may include any suitable network that can facilitate the exchange of information and/or data for the fashion design system 100. In some embodiments, one or more components of the fashion design system 100 (e.g., the user terminal 110, the processing device 130, the storage device 140) may communicate information and/or data with one or more other components of the fashion design system 100 via the network 120. For example, the processing device 130 may obtain instructions from the user terminal 110 via the network 120.

The processing device 130 may process data and/or information obtained from the user terminal 110, the storage device 140, or other components of the fashion design system 100. For example, the processing device 130 may determine information for arranging clothing patterns on a 3D avatar based on sewing relationships between the clothing patterns.

In some embodiments, the processing device 130 may be a single server or a server group. In some embodiments, the processing device 130 may be local to or remote from the fashion design system 100. Merely for illustration, only one processing device 130 is described in the fashion design system 100. However, it should be noted that the fashion design system 100 in the present disclosure may also include multiple servers. Thus operations and/or method steps that are performed by one processing device 130 as described in the present disclosure may also be jointly or separately performed by the multiple servers. For example, if in the present disclosure the processing device 130 of the fashion design system 100 executes both process A and process B, it should be understood that the process A and the process B may also be performed by two or more different servers jointly or separately in the fashion design system 100 (e.g., a first server executes process A and a second server executes process B, or the first and second servers jointly execute processes A and B).

The storage device 140 may store data, instructions, and/or any other information. In some embodiments, the storage device 140 may store data obtained from the processing device 130, and/or the user terminal 110. For example, the storage device 140 may store clothing patterns and 3D avatars displayed by the user terminal 110. As another example, the storage device 130 may store design results. In some embodiments, the storage device 140 may store data and/or instructions that the processing device 130 and/or the user terminal 110 may execute or use to perform exemplary methods described in the present disclosure. In some embodiments, the storage device 140 may be a part of the processing device 130 or the user terminal 110.

It should be noted that the above description of the fashion design system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the fashion design system 100 may include one or more additional components. Additionally or alternatively, one or more components of the fashion design system 100 described above may be omitted. As another example, two or more components of the fashion design system 100 may be integrated into a single component.

FIG. 3 is a block diagram illustrating an exemplary processing device 130 according to some embodiments of the present disclosure. As shown in FIG. 3, the processing device 130 may include a determination module 310, a selection module 320, an arrangement module 330, and a generation module 340.

The determination module 310 may be configured to determine sewing relationships between clothing patterns to be transformed into a digital garment on a 3D avatar. More descriptions regarding the determination of the sewing relationships may be found elsewhere in the present disclosure. See, e.g., operation 410 in FIG. 4, and relevant descriptions thereof.

The selection module 320 may be configured to select one or more clothing patterns to be processed in each of multiple iterations from the clothing patterns based on the sewing relationships. More descriptions regarding the selection of the clothing pattern(s) may be found elsewhere in the present disclosure. See, e.g., operation 420 in FIG. 4, and relevant descriptions thereof.

The arrangement module 330 may be configured to arrange the clothing pattern(s) to warp around the 3D avatar. More descriptions regarding the arrangement of the clothing pattern(s) may be found elsewhere in the present disclosure. See, e.g., operation 430 in FIG. 4, and relevant descriptions thereof.

The generation module 340 may be configured to generate the digital garment that is worn on the 3D avatar by sewing the arranged clothing patterns corresponding to the iterations based on the sewing relationships. More descriptions regarding the generation of the digital garment may be found elsewhere in the present disclosure. See, e.g., operation 450 in FIG. 4, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, any one of the modules may be divided into two or more units. For instance, the processing device 130 may include one or more additional modules, such as a storage module (not shown) for storing data. As another example, the selection module 320 and the arrangement module 330 may be integrated into a single processing module configured to process the clothing patterns by performing iterations.

Figure 4:
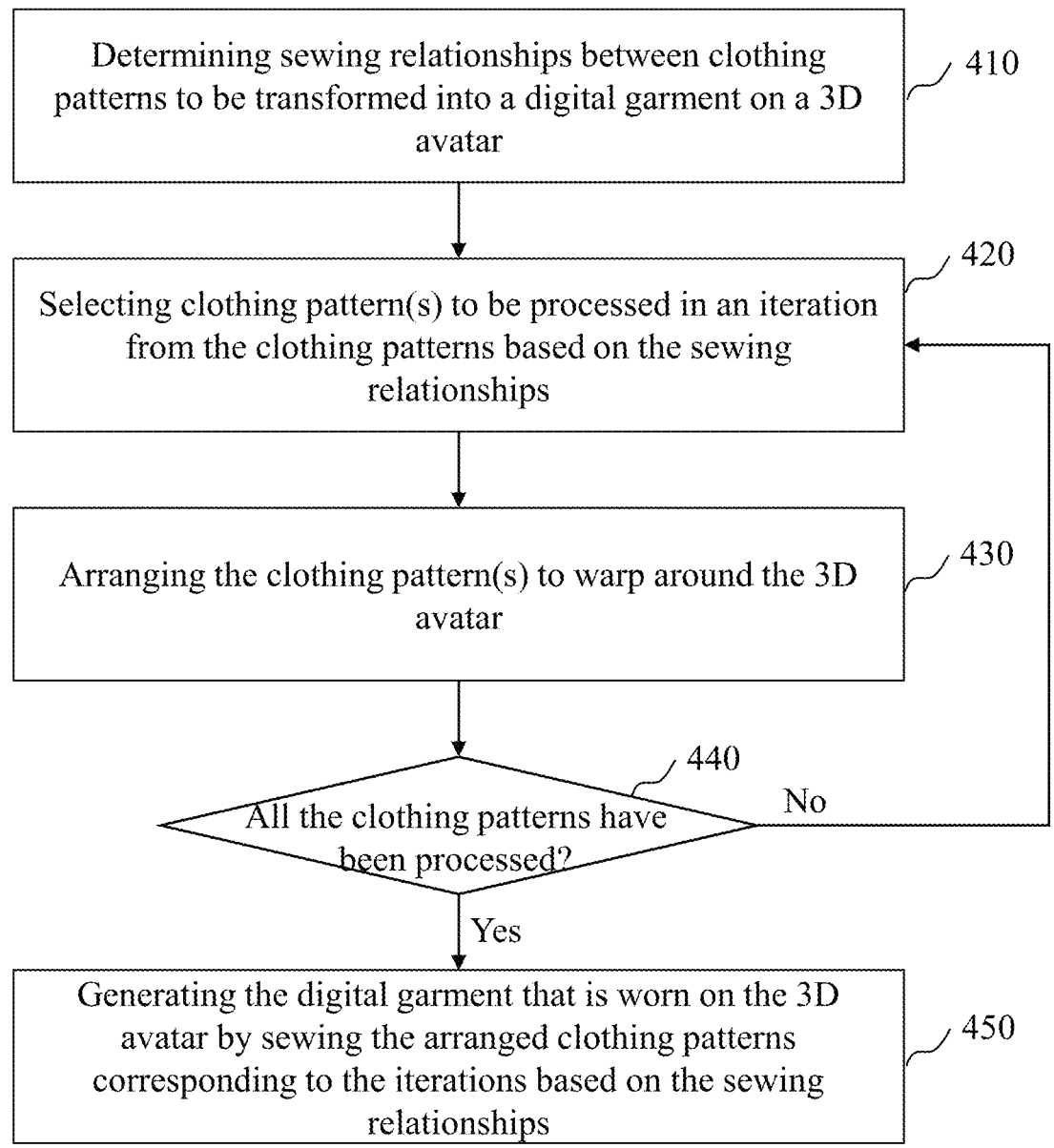
FIG. 4 is a flowchart illustrating an exemplary process for generating a digital garment according to some embodiments of the present disclosure.

FIG. 4 is a flowchart illustrating an exemplary process 400 for generating a digital garment according to some embodiments of the present disclosure.

In 410, the processing device 130 (e.g., the determination module 310) may determine sewing relationships between clothing patterns to be transformed into a digital garment on a 3D avatar.

As used herein, the 3D avatar refers to a 3D model of a subject, and a clothing pattern refers to a virtual plane pattern representing a fabric piece for producing clothes. For example, the digital garment may be produced using multiple clothing patterns and worn on the 3D avatar. In some embodiments, one or more features of a clothing pattern may be adjusted according to needs. Exemplary features of the clothing pattern may include a size, a shape, a material, or the like, or any combination. For example, a user may adjust the shape and/or size of a clothing pattern via the terminal device 110. The subject corresponding to the 3D avatar may include a human body or other animals. For illustration purposes, a human body is described as an example of the subject hereinafter.

In some embodiments, the 3D avatar may be a general human body model. In some embodiments, 3D avatars corresponding to different body types may be previously generated and stored in a storage device (e.g., the storage device 140 or an external storage device), and the 3D avatar may be selected from the storage device by the user via the user terminal 110. Exemplary body types may include a thin body type, a standard body type, an upper body obesity type, a lower body obesity type, a body type corresponding to a female, a body type corresponding to a male, or the like.

In some embodiments, the 3D avatar may be customized. For example, the 3D avatar may be a customized model that is designed according to information of the user (e.g., an image uploaded by the user). In some embodiments, the 3D avatar may be rotatable. In some embodiments, one or more features of the 3D avatar may be adjusted by the user via the user terminal 110. Exemplary features of the 3D avatar may include a body shape, a posture, a size, or the like, or any combination thereof.

The sewing relationships may indicate which clothing patterns need to be sewed together when generating the digital garment. If two edges of two clothing patterns need to be sewed together when generating the digital garment, a sewing relationship may exist between the two edges of the two clothing patterns, and the two edges may be referred to as sewing boundaries of the sewing relationship.

In some embodiments, the processing device 130 may determine information relating to sewing boundaries, sewing lines, sewing pairs, or the like, or any combination thereof, when it determines the sewing relationships. A sewing boundary refers to an edge of a clothing pattern that needs to be sewed with another edge of another clothing pattern. The sewing boundary can also be referred to as a sewing edge or a boundary edge. A sewing line refers to a line connecting sewing boundaries that have a sewing relationship. A sewing pair includes two points in the sewing boundaries that have a sewing relationship, wherein the two points are connected by a sewing line.

Figure 7A:
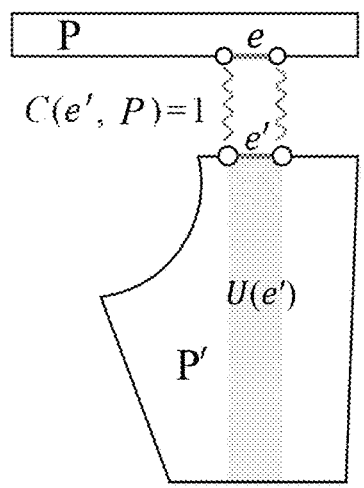
FIGS. 7a-7c illustrate exemplary sewing boundaries, sewing lines, and sewing pairs according to some embodiments of the present disclosure.
Figure 7B:
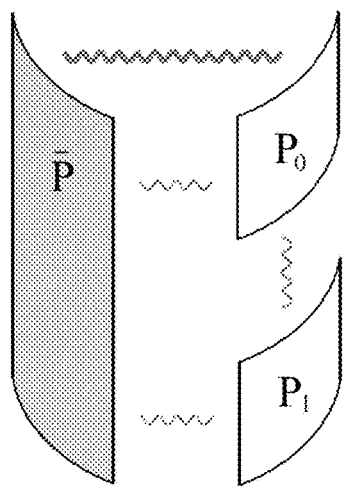
Figure 7C:
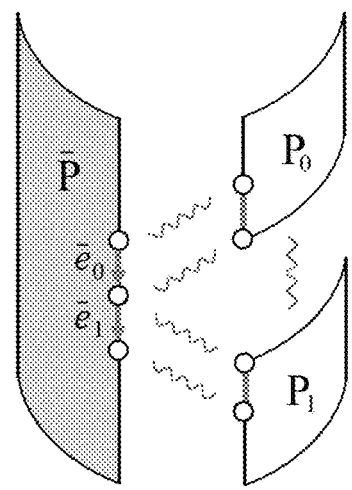

For illustration purposes, FIGS. 7a-7c illustrate exemplary sewing boundaries, sewing lines, and sewing pairs according to some embodiments of the present disclosure. Taking FIG. 7a as an example, an edge e of a clothing pattern P and an edge e' of a clothing pattern P' have a sewing relationship with each other, the edges e and e' are referred to as sewing boundaries with a sewing relationship, the edges e and e' are connected by sewing lines indicated by wave lines in FIG. 7a, and each sewing line connects two points of the edges e and e' indicated by hollow circles in FIG. 7a.

In some embodiments, the processing device 130 may determine the sewing relationships between the clothing patterns by analyzing the shape, the size, and/or other features of the clothing patterns. In some embodiments, at least part of the sewing relationships may be determined based on input of a user. For example, the user may manually assign a sewing relationship to two edges of two clothing patterns via the user terminal 110. In some embodiments, the sewing relationships may be previously determined by the processing device 130 or another processing device, the processing device 130 may obtain the sewing relationships from the other processing device or a storage device that stores the sewing relationships.

After the sewing relationships are determined, the processing device 130 may perform iterations to process the clothing patterns. In each iteration, operations 420, 430, and 440 may be performed.

In 420, the processing device 130 (e.g., the selection module 320) may select one or more clothing patterns to be processed in the iteration from the clothing patterns based on the sewing relationships. In 430, the processing device 130 (e.g., the arrangement module 330) may arrange the clothing pattern(s) to warp around the 3D avatar.

As used herein, the term "arranging a clothing pattern" refers to a process of transforming a clothing pattern into a 3D clothing pattern that warps around the 3D avatar. It can be understood that when a clothing pattern is worn on the 3D avatar, the shape of the clothing pattern may change to conform to the body shape of the 3D avatar and warp around the 3D avatar.

In some embodiments, a clothing pattern may be represented by a geometric pattern. The geometric pattern may include multiple meshes. Exemplary meshes may include triangular meshes, quadrilateral meshes, or the like, or any combination thereof. When arranging a clothing pattern, the processing device 130 may determine positions of vertices of the clothing pattern on the 3D avatar. The position of a vertex on the 3D avatar refers to the position of the vertex in a 3D coordinate system corresponding to the 3D avatar.

The clothing pattern(s) selected in the first iteration of the iterations are also referred to as seed clothing pattern(s), and the process of selecting the seed clothing pattern(s) is also referred to as a seeding process. In some embodiments, the seed clothing pattern(s) are determined based on the body part corresponding to each clothing pattern. In some embodiments, the seed clothing pattern(s) are determined using an AI-based approach. In some embodiments, the seed clothing pattern(s) may be determined based on a selection instruction input by a user. More descriptions regarding the selection of the seed clothing pattern(s) may be found in operations 501 and 502 in FIG. 5. More descriptions regarding the arrangement of the seed clothing pattern(s) may be in operation 503 in FIG. 5.

In an iteration other than the first iteration, the processing device 130 may determine, from the clothing patterns, one or more first clothing patterns that have been processed in historical iterations(s) and second clothing patterns that have not been processed. The first clothing pattern(s) may also be referred to as reference clothing patterns. The processing device 130 may further select the clothing pattern(s) to be processed from the second clothing patterns based on the sewing relationships between each second clothing pattern and the first clothing pattern(s). In other words, the clothing pattern(s) to be processed in a later iteration are determined based on the clothing pattern(s) that have been processed in former iteration(s). More descriptions regarding the clothing pattern selection in other iterations may be found in operation 504 in FIG. 5.

After the clothing pattern(s) to be processed are determined in an iteration other than the first iteration, the processing device 130 may arrange the clothing pattern(s) using a phased approach. Specifically, the processing device 130 may align the clothing pattern(s) to one or more first clothing patterns that have been processed, perform intersection removal on the one or more aligned clothing patterns to determine one or more refined clothing patterns, and then determine the one or more arranged clothing patterns based on the one or more refined clothing patterns. More descriptions regarding the clothing pattern arrangement in other iterations may be found in operation 505 in FIG. 5.

In each iteration, after arranging the clothing pattern(s), the processing device 130 (e.g., the determination module 310) may perform operation 440 to determine whether all the clothing patterns have been processed. If all the clothing patterns have been processed, the process 400 may proceed to operation 450. If there is one or more clothing patterns have not been processed, the process 400 may proceed to operation 420 to perform a next iteration until all the clothing patterns are processed.

In 450, the processing device 130 (e.g., the generation module 340) may generate the digital garment that is worn on the 3D avatar by sewing the arranged clothing patterns corresponding to the iterations based on the sewing relationships.

Figure 8A:
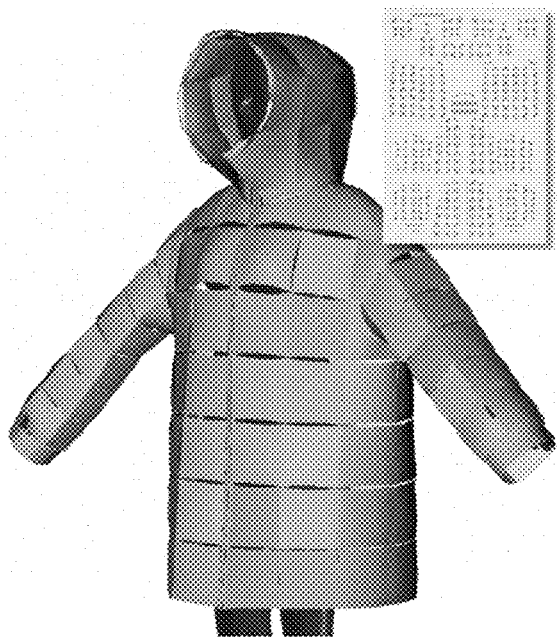
FIGS. 8a and 8b illustrate the front and the back of an initial digital garment according to some embodiments of the present disclosure.
Figure 8B:
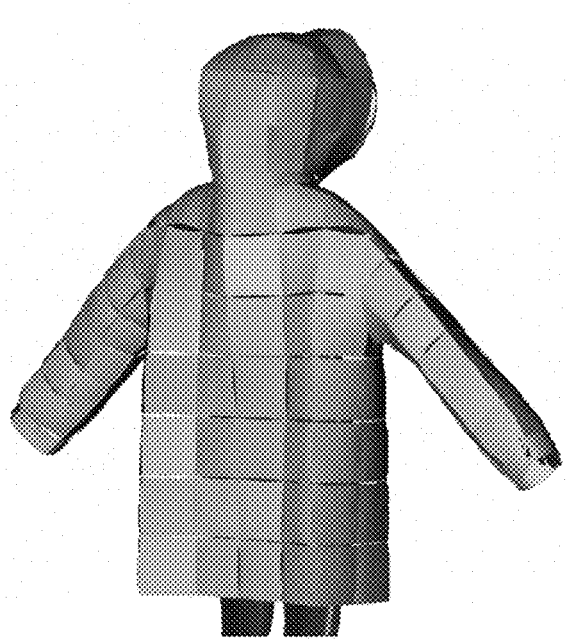
Figure 8C:
FIGS. 8c and 8d illustrate the front and the back of a simulated digital garment according to some embodiments of the present disclosure.
Figure 8D:

For example, in generating the digital garment, arranged clothing patterns that have a sewing relationship may be sewed together. In some embodiments, the processing device 130 may first generate an initial digital garment by sewing the arranged clothing patterns, and then generate a simulated digital garment that is more like real clothes by processing the initial digital garment using rendering techniques, cloth simulation techniques, etc. For illustration purposes, FIGS. 8*a* and 8*b* illustrate the front and the back of an initial digital garment according to some embodiments of the present disclosure. FIGS. 8*c* and 8*d* illustrate the front and the back of a simulated digital garment according to some embodiments of the present disclosure. It should be understood that the digital garment generated in operation 450 may include an initial digital garment and/or a simulated digital garment.

According to some embodiments of the present disclosure, multiple iterations are performed to process the clothing patterns, and only a set of clothing patterns are processed in each iteration. In conventional approaches, all the clothing patterns are processed at the same time, which results in that the arrangement process is time-consuming and the arrangement accuracy is low due to visual artifacts (e.g., inter-piece intersection). By determining the order of clothing pattern arrangement and processing a set of clothing patterns at each iteration, the arrangement efficiency and the arrangement accuracy can be improved.

Figure 5:
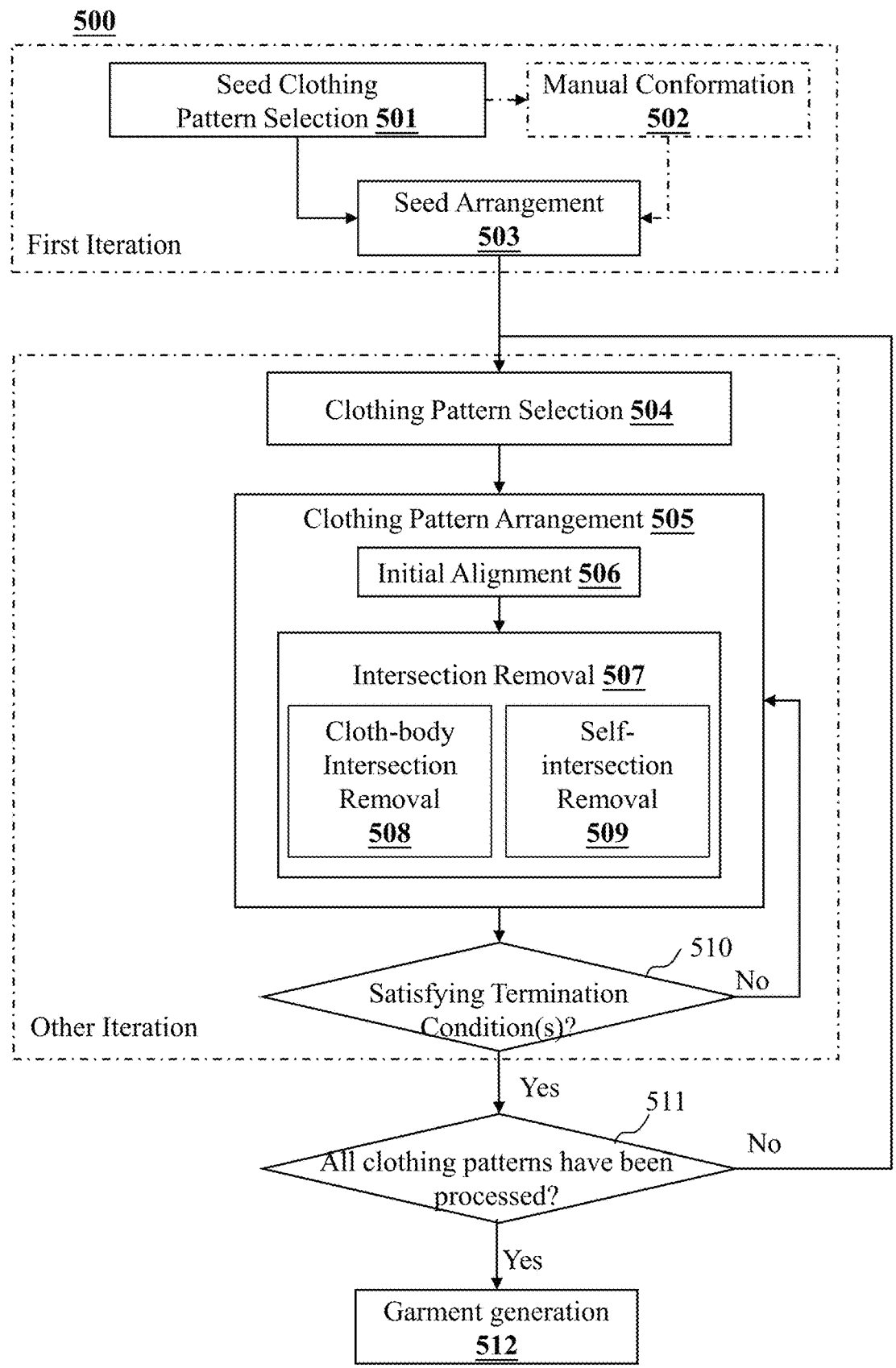
FIG. 5 is a schematic diagram illustrating an exemplary process for performing iterations to process clothing patterns according to some embodiments of the present disclosure.

FIG. 5 is a schematic diagram illustrating an exemplary process 500 for performing iterations to process clothing patterns according to some embodiments of the present disclosure.

As shown in FIG. 5, in the first iteration, the processing device 130 may perform operations 501 and 503, or the processing device 130 may perform operations 501, 502, and 503.

In 501, the processing device 130 may select seed clothing pattern(s).

In some embodiments, the selection of seed clothing pattern(s) may be regarded as a clothing pattern classification problem, with a special aim of finding the clothing pattern(s) covering one or more target body parts. Exemplary target body parts may include the neck, the waist, or the torso. Specifically, in operation 501, for each of the clothing patterns, the processing device 130 may determine a body part corresponding to the clothing pattern based on the sewing relationships of the clothing pattern. The processing device 130 may further determine the one or more clothing patterns from the clothing patterns based on the body part corresponding to each of the clothing patterns. For example, a clothing pattern corresponding to a target body part may be designated as a seed clothing pattern.

Merely by way of example, clothing pattern(s) corresponding to the neck or the waist may be selected as the seed clothing pattern(s). If there is no clothing pattern(s) corresponding to the neck or the waist, clothing pattern(s) corresponding to the torso may be selected as the seed clothing pattern(s). Clothing pattern(s) of these target body parts are typically at the top of a garment and, therefore are more suitable to be the seed clothing pattern(s). Selecting suitable seed clothing pattern(s) can improve the efficiency and accuracy of subsequent clothing pattern arrangement in later iterations.

In some embodiments, the count of the seed clothing pattern(s) may be one. In some embodiments, since it is possible to find multiple clothing patterns covering the waist, before selecting the seed clothing pattern(s), the processing device 130 may select rectangular clothing patterns with their width-to-height aspect ratios above a threshold value (e.g., three) and merge them if they are connected by sewing lines in a head-to-tail fashion. In this way, only one clothing pattern corresponding to the waist may be determined.

In some embodiments, an AI-based approach may be used to determine the body part corresponding to each clothing pattern. More descriptions regarding the AI-based approach may be found elsewhere in the present disclosure. See, e.g., FIG. 6 and relevant descriptions thereof.

In 502, the processing device 130 may send the selection result of the seed clothing pattern(s) to a user terminal for manual confirmation.

A user may confirm whether the seed clothing pattern(s) are suitable via the user terminal. If the seed clothing pattern(s) are not suitable, the user may manually select the seed clothing pattern(s). In some embodiments, operation 502 may be omitted. In some embodiments, operation 502 may be performed only if the processing device 130 fails to find any seed clothing pattern(s) in operation 501.

In 503, the processing device 130 may arrange the seed clothing pattern(s).

In some embodiments, the processing device 130 may determine the positions of the vertices of the seed clothing pattern(s) on the 3D avatar by solving an optimization problem represented by Equation (1) below:

$$x = \operatorname*{argmin}_{x} F^{init}(x), \tag{1}$$

where x denotes a collection of the positions of the vertices of the seed clothing pattern(s) on the 3D avatar, and $F^{init}(x)$ denotes an optimization objective. Merely by way of example, the optimization objective may be represented by Equation (2) below:

$$F^{init}(x) = F^{cent}(x) + F^{up}(x) + F^{dist}(x) + F^{def}(x), \tag{2}$$

where $F^{cent}(x)$ refers to a centering optimization term (or referred to as a centering potential), $F^{up}(x)$ refers to an upward optimization term (or referred to as an upward potential), $F^{dist}(x)$ refers to a body distance optimization term (or referred to as a body distance potential), and $F^{def}(x)$ refers to a deformation optimization term (or referred to as a deformation potential).

The centering optimization term $F^{cent}(x)$ may relate to a distance between a position of a central vertex of a seed clothing pattern on the 3D avatar and an assigned position of the central vertex on the 3D avatar. For example, the centering optimization term $F^{cent}(x)$ may be represented by Equation (3) below:

$$F^{cent}(x) = \frac{1}{2} k^{ctr} \left\| x_c - x_c^0 \right\|^2, \tag{3}$$

where $x_c$ refers to the position of the central vertex on the 3D avatar, $x_c^0$ refers to the assigned position of the central vertex on the 3D avatar, $k^{ctr}$ refers to a weight or a strength parameter of the centering optimization term $F^{cent}(x)$. The assigned position of the central vertex may be determined based on the body part corresponding to the seed clothing pattern or determined manually by a user.

The upward optimization term $F^{up}(x)$ may be used to maintain the seed clothing pattern(s)' orientation upward. For example, the upward optimization term $F^{up}(x)$ may be represented by Equation (4) below:

$$F^{up}(x) = -\frac{1}{2}k^{up}\sum_i \text{Sign}\left((r_i - r_c)^T \begin{bmatrix} 0 \\ 1 \end{bmatrix}\right)(x_i - x_c)^T \begin{bmatrix} 0 \\ 1 \\ 0 \end{bmatrix}, \quad (4)$$

where $r_i$ refers to a 2D position of the vertex i in a 2D coordinate system corresponding to a seed clothing pattern, $r_c$ refers to a 2D position of the central vertex of the seed clothing ppatternin the 2D coordinate system, $x_i$ refers to the position of the vertex i on the 3D avatar, $x_c$ refers to the position of the central vertex on the 3D avatar, and $k^{up}$ refers to a weight or a strength parameter of the upward optimization term $F^{up}(x)$.

The body distance optimization term $F^{dist}(x)$ may be used keep the seed clothing pattern(s) at a desired distance to the body of the 3D avatar. For example, the body distance optimization term $F^{dist}(x)$ may be represented by Equation (5) below:

$$F^{dist} = \frac{1}{2}k^{dist}\sum_i \max(\text{Sign}(n(x_i) \cdot \nabla \phi(x_i)), 0)(\phi(x_i) - D)^2, \quad (5)$$

where $n(x_i)$ refers to the normal of the vertex i of the seed clothing pattern(s), $\Phi(x_i)$ refers to the signed distance from the position of the vertex i to the body of the 3D avatar, D is the desired vertex-body distance, and $k^{dist}$ refers to a weight or a strength parameter of the body distance optimization term $F^{dist}(x)$. In Equation (5), it disables the body distance potential of vertex i if the vertex is facing toward the 3D avatar. This is to prevent the shape of the seed clothing pattern(s) from being stuck in a self-folded local minimum state.

The deformation optimization term $F^{def}(x)$ may be used to constrain the deformation of the shape of the seed clothing pattern(s), including both planar and bending deformations. For simplicity, the spring model may be utilized to limit planar deformation for each mesh edge, and the quadratic model may be utilized to limit bending deformation for each dihedral edge. Other deformation models may also be used in other embodiments of the present disclosure.

In some embodiments, the processing device 130 may solve the optimization objective in Equation (2) using various solvers. Exemplary solvers may include a CPU-based preconditioned gradient descent solver, a nonlinear conjugate gradient solver, a nonlinear LBFGS solver, a GPU solver, or the like.

It should be noted the optimization objective for arranging the seed clothing pattern(s) described above is merely provided for illustration purposes, and is not intended to be limiting. In some embodiments, one or more optimization terms of Equation (2) may be omitted or replaced by other optimization terms having the same function.

Referring to FIG. 5, in each iteration other than the first iteration, operations 504, 505, and 510 may be performed.

In 504, the processing device 130 may select the clothing pattern(s) to be processed in the iteration.

Given a set of clothing patterns already being arranged on the 3D avatar, we are now faced with the task of determining the next clothing pattern(s) for arrangement. This process is pivotal, as it not only influences the quality of the final result but also dictates how the system handles inter-piece intersections.

In some embodiments, the processing device 130 may determine, from the clothing patterns, one or more first clothing patterns that have been processed and second clothing patterns that have not been processed. The processing device 130 may further select the clothing pattern(s) to be processed from the second clothing patterns based on the sewing relationships between the second clothing patterns and the one or more first clothing patterns.

In some embodiments, for each second clothing pattern, the processing device 130 may determine a recommendation score of the second clothing pattern based on the sewing relationships between the second clothing pattern and the one or more first clothing patterns. The recommendation score of a second clothing pattern may indicate whether the second clothing pattern is recommended to be processed in the iteration. The processing device 130 may then determine the clothing pattern(s) to be processed from the second clothing patterns based on the recommendation score of each second clothing pattern. For example, a single clothing pattern with the highest recommendation score may be selected as the clothing pattern(s) to be processed.

Figure 6:
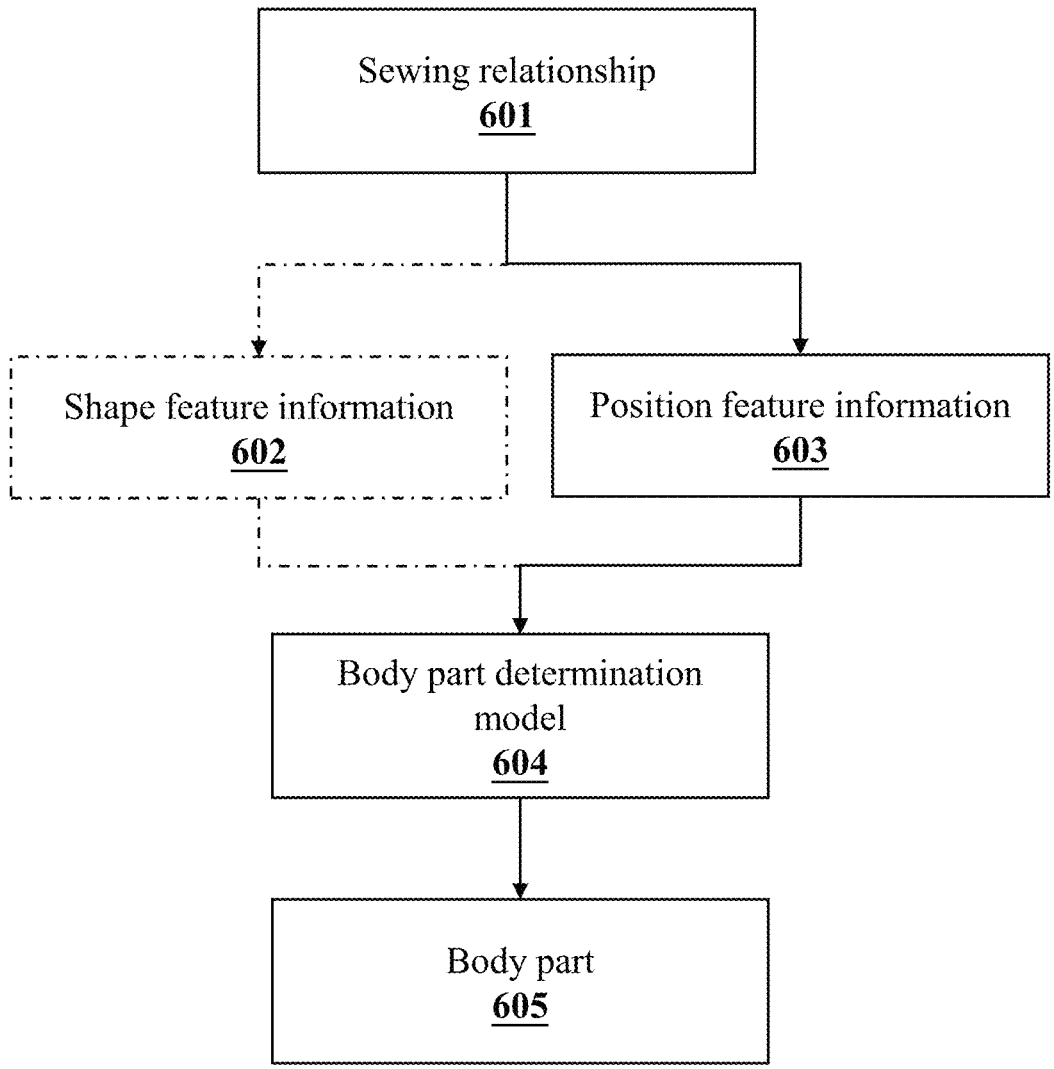
FIG. 6 is a schematic diagram illustrating an exemplary process for determining a body part corresponding to a clothing pattern according to some embodiments of the present disclosure.

In some embodiments, the recommendation score of a second clothing pattern may be associated with the length of edges of the second clothing pattern that are connected to the first clothing pattern(s) via sewing lines, the area of the second clothing pattern, the position of the second clothing pattern relative to the first clothing pattern(s), or the like, or any combination thereof. For example, the recommendation score of a second clothing pattern P may be determined according to Equation (6) below:

$$H(P) = \frac{\sum_{e \in \partial P} C(e, \overline{P}) L_e^0}{\sum_{e \in \partial P} L_e^0} + s_a A(P) + s_b S_{\overline{P} \to P}, \quad (6)$$

where H(P) refers to the recommendation score of the second clothing pattern P, $\overline{P}$ refers to the set of the first clothing pattern(s), e refers to a set of boundary edges of the second clothing pattern P, $L_e^0$ is the reference length of the boundary edge e (e.g., the length of the boundary edge in a 2D coordinate system corresponding to the second clothing pattern P), A(P) is the reference area of the second clothing pattern P (e.g., the area of the second clothing pattern P in the 2D coordinate system), $S_{\overline{P} \to P}$ refers to position feature information indicating the position of the first clothing pattern(s) P to the second clothing pattern P (which may be determined based on Equation (16) described in FIG. 6), $C(e, \overline{P})$ indicates whether the boundary edge e and the first clothing pattern(s) is connected by any sewing line (which may be determined based on Equation (17) described in FIG. 6), and $s_a$ and $s_b$ are two weight variables.

In Equation (6), the first term gives precedence to clothing patterns whose sewing boundaries are mostly determined by $\overline{P}$ already, the second term prioritizes the arrangement of large clothing patterns, and the third term underscores the importance of selecting clothing patterns that can be well supported from the top. For example, referring to FIG. 7b, the clothing pattern $\bar{P}$ is a first clothing pattern that has been processed, the clothing patterns $P_0$ and $P_1$ are second clothing patterns that have not been processed. By using the third term, P with thickened sewing lines connected to the clothing pattern $\bar{P}$ on the top has a higher recommendation score. Without the third term, the clothing pattern $P_1$ may have a higher recommendation score, which could sag excessively under gravity during subsequent processing operations, due to missing support from the top.

In some occasions, it is necessary to arrange multiple clothing patterns simultaneously for two compelling reasons. The first reason arises when a single clothing pattern is intentionally divided into multiple components, often due to the use of different fabrics, such as a trench coat. Arranging these clothing patterns consecutively could result in an improper fit to the corresponding body part. The second reason is related to parallelization. Since there are many small clothing patterns, sequencing such small clothing patterns one after another would not fully leverage the power of parallel processing.

To address above mentioned problems, the processing device 130 may select multiple target clothing patterns from the second clothing patterns as the clothing pattern(s) to be processed. For example, each target clothing pattern has a recommendation score higher than a score threshold, and the total number of vertices of the target clothing patterns is smaller than a number threshold (e.g., 1,024). As another example, the target clothing patterns may be selected randomly and the total number of vertices of the target clothing patterns is smaller than the number threshold.

In some embodiments, to identify clothing patterns that can be arranged as a unified whole, the processing device 130 may determine one or more pattern sets based on the sewing relationships between the second clothing patterns and the one or more first clothing patterns; and determine the clothing pattern(s) based on the one or more pattern sets. Each pattern set may include second clothing patterns whose sewing boundaries are connected on the one or more first clothing patterns.

For example, referring to FIG. 7c, the clothing pattern P is a first clothing pattern that has been processed, the clothing patterns $P_0$ and $P_1$ are second clothing patterns that have not been processed. The clothing patterns $P_0$ and $P_1$ may be divided into one pattern set because the sewing boundary $\bar{e}_0$ of the clothing pattern $P_0$ and the sewing boundary $\bar{e}_1$ of the clothing pattern $P_1$ are smoothly connected on the clothing pattern $\bar{P}$. This indicates that the clothing patterns $P_0$ and $P_1$ are parts of a larger, combined clothing pattern.

After the pattern set(s) are determined, the processing device 130 may determine the clothing pattern(s) to be processed based on the pattern set(s). For example, the second clothing patterns in each pattern set may be combined into a single clothing pattern. The processing device 130 may determine the recommendation score of the combined clothing pattern, similar to other individual clothing patterns, and decide the clothing pattern(s) based on the recommendation score of each individual clothing pattern and each combined clothing pattern.

As another example, the processing device 130 may select the clothing pattern(s) from the combined clothing pattern and other individual clothing patterns based on the count of vertices. By determining the combined clothing pattern, clothing patterns belonging to a unified piece can be processed simultaneously, thereby improving the arrangement accuracy and efficiency.

In 505, the processing device 130 may arrange the clothing pattern(s) selected in the iteration.

In some embodiments, the processing device 130 may formulate the arrangement of the newly selected clothing pattern(s) as a second optimization problem with a second optimization function as below:

$$F(x) = F^{def}(x) + F^{sew}(x) + F^{ext}(x) + F^{body}(x) + F^{self}(x), \quad (7)$$

where $F^{def}(x)$ is the same as the deformation optimization term as described in Equation (2), $F^{sew}(x)$ refers to a sewing gap optimization term (or referred to as a sewing potential), $F^{ext}(x)$ refers to an external optimization term (or referred to as an external potential), $F^{body}(x)$ refers to a body intersection optimization term (or referred to as a body repulsion potential), and $F^{self}(x)$ refers to a self-intersection optimization term (or referred to as a self-repulsion potential). The processing device 130 may arrange the newly selected clothing pattern(s) by solving the second optimization function.

Figure 9A:
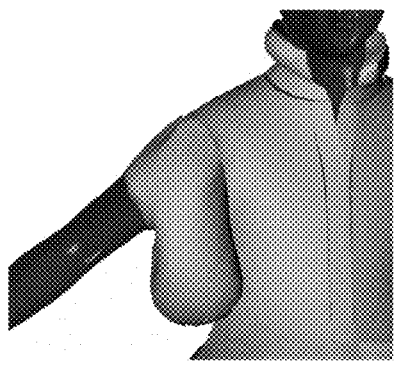
FIGS. 9a-9f illustrate exemplary arrangement results of clothing patterns according to some embodiments of the present disclosure.

In some embodiments, since solving the second optimization function immediately is prone to local minima issues as illustrated in FIG. 9a, the processing device 130 may employ a phased approach to gradually introduce new potentials into the optimization process to overcome this challenge. Specifically, as shown in FIG. 5, the clothing pattern arrangement process 505 includes operations 506 and 507.

In 506, the processing device 130 may perform initial alignment to align the clothing pattern(s) to the first clothing pattern(s) that have been processed based on the sewing relationships between the clothing pattern(s) and the first clothing pattern(s).

In some embodiments, the processing device 130 may determine one or more sewing pairs based on the sewing relationship between the clothing pattern(s) and the first clothing pattern(s). Each sewing pair may include a first vertex of the clothing pattern(s) and a corresponding second vertex of the first clothing pattern(s), wherein the first vertex and the second vertex are connected by a sewing line. The processing device 130 may further determine one or more transformed clothing patterns by applying affine transformation on the clothing pattern(s) to minimize a sewing gap between the clothing pattern(s) and the first clothing pattern(s) based on an arranged position of the second vertex of each sewing pair. The sewing gap may be used to measure a gap between two clothing patterns after they are arranged on the 3D avatar. The arranged position of a vertex refers to the position of the vertex on the 3D avatar after it is arranged on the 3D avatar. The processing device 130 may then determine the aligned clothing pattern(s) by solving a target optimization function based on the arranged position of the second vertex of each sewing pair and the transformed clothing pattern(s).

Merely by way of example, let $\bar{P}$ be the set of first clothing pattern(s) and P be the selected clothing pattern(s) to be processed. The processing device 130 may apply an affine transformation $\{t, A | t \in R^3, A \in R^{3\times 2}\}$ on the clothing pattern(s) P to minimize the sewing gap between P and $\bar{P}$ according to Equation (8) below:

$$\{t, A\} = \mathrm{argmin} \sum_{(i,j) \in S, i \in P, j \in \bar{P}} \|t + Ar_i - x_j\|^2, \quad (8)$$

where S refers to a set of sewing pairs between all clothing patterns, {i, j} is a sewing pair between P and $\overline{P}$, i is the first vertex of P, j is the second vertex of $\overline{P}$, $r_i$ is the 2D pattern position of vertex i in a 2D coordinate system corresponding to P, and $x_j$ is the arranged position of vertex j. In some embodiments, Equation (8) may be solved using a closed-form solution, which requires at least two non-trivial sewing lines between P and $\overline{P}$. If that is not true, A may be set to $[I\ 0]^T$.

After the clothing pattern(s) P are transformed, the processing device 130 may further optimize its shape to determine the aligned clothing pattern(s) by minimizing a target optimization function $F(x)=F^{sew}(x)+F^{def}(x)+F^{ext}(x)$. The target optimization function may be part of the second optimization function in Equation (7) described above.

The sewing gap optimization term $F^{sew}(x)$ may be used to minimize the distance between sewing pairs of the clothing patterns P and $\overline{P}$. For example, the sewing gap optimization term $F^{sew}(x)$ may be defined by quadratic energies according to Equation (9) below:

$$F^{sew}(x) = \frac{1}{2}k^{sew}\sum_{\{i,j\}\in S}\|x_i - x_j\|^2, \qquad (9)$$

where $x_i$ is the arranged position of vertex i, and $k^{sew}$ is a weight or a strength parameter of the sewing optimization term.

Figure 10A:
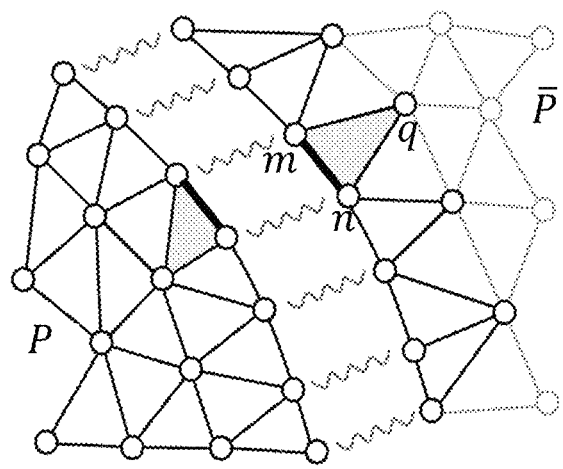
FIGS. 10a and 10b illustrates exemplary clothing patterns according to some embodiments of the present disclosure.

The external optimization term $F^{ext}(x)$ may be used to prevent the clothing pattern(s) P from getting stuck in the opposite side of its sewing boundaries. For example, the external optimization term $F^{ext}(x)$ may be defined according to Equation (10) below:

$$F^{ext}(x) = \frac{1}{2}k^{fix}\sum_{j\in\overline{P}}\|x_j - x_j^0\|^2 - k^{const}\sum_{i\in P}x_i^T\frac{f}{\|f\|}, \qquad (10)$$

where $k^{fix}$ and $k^{const}$ are two weight parameters, $x_j^0$ refers to the arranged position of vertices j of the clothing pattern(s) $\overline{P}$. In equation (10), the first term tries to prevent each vertex j of the clothing pattern(s) $\overline{P}$ from leaving its originally arranged position $x_j^0$ while the second term pushes each vertex i of the second clothing pattern(s) P in a constant direction f. f may be equal to $\Sigma_{\{m,n,qZ\}}(x_m+x_n-2x_q)$, in which m, n, and q are the vertices of a sewing boundary triangle on the clothing pattern(s) $\overline{P}$ as shown in FIG. 10a. Without the second term, P may get stuck in the opposite side of its sewing boundaries.

In some embodiments, to smooth the boundary between P and $\overline{P}$, the problem domain x of Equation (10) may include the vertices of the clothing pattern(s) P and a portion of the vertices of the clothing pattern(s) $\overline{P}$ near the sewing boundaries of the clothing pattern(s) $\overline{P}$. For example, two-ring vertices near the sewing boundary of $\overline{P}$, indicated by dark hollow circles on $\overline{P}$ as FIG. 10a shows, are included in the problem domain of Equation (10). In other words, when solving Equation (10), the position of the two-ring vertices of $\overline{P}$ may be rearranged to improve the smoothness of the boundary between P and $\overline{P}$.

Figure 9B:
Figure 9C:
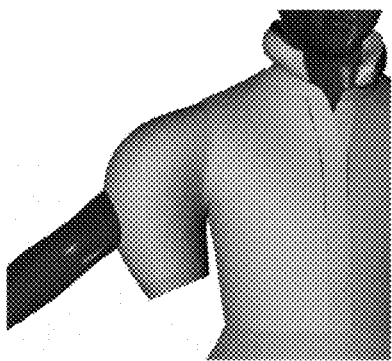

In some embodiments, sewing edge pairs may be integrated into the dihedral edge set $\varepsilon'$, if the two sewing edges are topologically consistent. For example, as shown in FIG. 10a, two sewing edges of P and $\overline{P}$ indicated by bold black lines are topologically consistent. In some embodiments, to help reduce the local minima issue related to bending deformation, the magnitude of bending resistance may be increased. The results of a selected sleeve after affine transformation and initial alignment are shown in FIGS. 9b and 9c, respectively.

In, 507, the processing device 130 may further perform intersection removal on the aligned clothing pattern(s) to determine one or more refined clothing patterns.

In some embodiments, operation 507 includes operation 508 and/or operation 509.

In 508, the processing device 130 may perform cloth-body intersection removal to remove cloth-body intersections between the aligned clothing pattern(s) and the 3D avatar.

The body intersection removal step resembles the initial alignment step as described in connection with operation 506, but using a first updated optimization function. The first updated optimization function may include the target optimization function as described in operation 506 and an additional first optimization term. The first optimization term is the body intersection optimization term $F^{body}(x)$, which relates to the distance between vertices needs to be processed and the 3D avatar. For example, the body intersection optimization term $F^{body}(x)$ may be defined by Equation (11) below:

$$F^{body}(x) = \frac{1}{2}k^{body}\sum_i(\min(\phi(x_i) - \varepsilon, 0))^2, \qquad (11)$$

where i is a vertex of the aligned clothing pattern(s) to be processed, $\Phi(x_i)$ is the signed distance function from the arranged position of vertex i to the 3D avatar, $k^{body}$ is a weight or a strength parameter of the body intersection optimization term $F^{body}(x)$, and E is a repulsion buffer distance. In some embodiments, ϵ may be equal to 3 mm, 4 mm, etc.

Figure 9D:
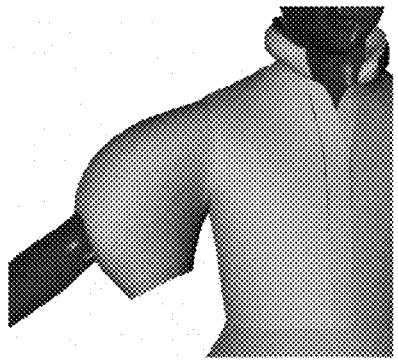

If the body intersection optimization term $F^{body}(x)$ is activated for all of the vertices of the aligned clothing pattern(s) immediately, the simulation could easily be trapped in local minima with body intersections, as evident in FIG. 9d, since the initial alignment of the clothing pattern(s) does not account for body collisions. To address this issue, the processing device 130 may divide vertices of the aligned clothing pattern(s) into multiple sets based on positions of the vertices relative to a sewing boundary of the aligned clothing pattern(s), and sequentially process the multiple sets. For example, each set may include vertices that are in one ring and have similar distances to the sewing boundary of the aligned clothing pattern(s). In such cases, vertices in different sets may have different distances to the sewing boundary of the aligned clothing pattern(s). The multiple sets may be processed in a specific sequence.

Because the sewing boundary vertices connected to $\overline{P}$ do not experience the intersection issue, the processing device 130 may incrementally activate the body intersection optimization term $F^{body}(x)$ of the vertices through a flood fill process initiated from the sewing boundary.

Figure 9E:
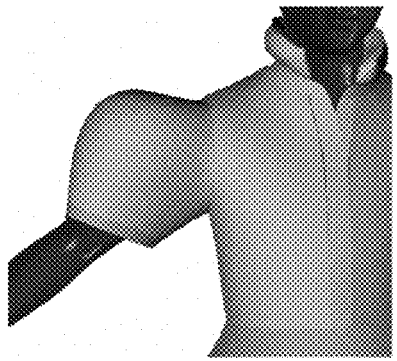

This method mimics the real-world process of donning a garment: as the body extends, the clothing untangles and covers the body, as FIG. 9e shows. For example, a set including vertices closer to the sewing boundary of the aligned clothing pattern(s) may be processed earlier. Merely by way of example, an aligned clothing pattern includes three rings of vertices that are determined as a set S1, a set S2, and a set S3, wherein vertices in set Si are closest to the sewing boundary, and vertices in the set S3 are farthest to the sewing boundary. The vertices in set Si may be processed first by solving the first updated optimization function, then the vertices in set S2 together with the processed vertices in set Si may be processed by solving the first updated optimization function, and then the vertices in set S3 together with the processed vertices in sets S1 and S2 may be processed by solving the first updated optimization function.

In 509, the processing device 130 may perform self-intersection removal to remove self-intersections of the aligned clothing pattern(s) to make further refinements to the garment shape.

The self-intersection may include two types: intra-piece intersections and inter-piece intersections. In some embodiments, for each vertex of the one or more aligned clothing patterns, the processing device 130 may determine a reference triangle including vertices of the one or more first clothing patterns. For example, the reference triangle of a vertex of an aligned clothing pattern P may be the closest triangle t={j, k, l} within the clothing pattern(s) $\overline{P}$.

Further, the processing device 130 may remove self-intersection of the one or more aligned clothing patterns by solving a second updated optimization function. The second updated optimization function may include the target optimization function and a second optimization term relating to a position of each vertex of the aligned clothing pattern(s) relative to its reference triangle. The second optimization term is the self-intersection optimization term $F^{self}(x)$.

For example, the self-intersection optimization term $F^{self}(x)$ may be used to constrain that each vertex of the aligned clothing pattern(s) is located outside its corresponding reference triangle, so that the arranged clothing pattern(s) is located outside of the already arranged clothing pattern $\overline{P}$. In some embodiments, the self-intersection optimization term $F^{self}(x)$ may be defined by Equation (12) below:

$$F^{self}(x) = \frac{1}{2} k^{self} \sum_{i \in P} (\min((x_i - x_j) \cdot n(t) - \epsilon, 0))^2, \quad (12)$$

where n(t) is the constant normal of the reference triangle t of vertex i, j can be any vertex in the reference triangle t, $k^{self}$ is a weight or a strength parameter of the self-intersection optimization term $F^{self}(x)$, and E is the same buffer distance used in Equation (11).

One advantage of the approach disclosed herein is that we do not require the complete elimination of intersections during the initial arrangement process, which would necessitate a large $k^{self}$ and significant computational time. Instead, we can address any remaining intersection in post-processing. This is possible because the inside-outside relationship among clothing patterns remains unchanged once it is determined by the clothing pattern arrangement order.

Figure 9F:
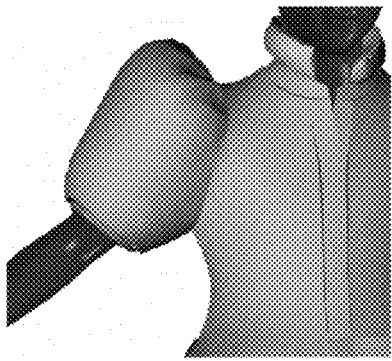

In some embodiments, during the shape refinement process in operation 509, our optimization occurs in two phases. In the first phase, the self-intersection optimization term $F^{self}(x)$ may be introduced into the target optimization function and bending resistance may be reduced to its normal value, allowing cloth to bend more readily. In the second phase, the external optimization term $F^{ext}(x)$ may be replaced by gravitational potential, so that cloth can drape naturally. Furthermore, the problem domain of the second updated optimization function may be beyond the two-ring sewing boundary neighborhood of the clothing pattern(s) P, the vertices on $\overline{P}$ may be fixed only if they are away from the boundary. This expansion helps refine the garment shape near the sewing boundary, especially for shirring as FIG. 9f shows. For example, the problem domain of the second updated optimization function may include 16-ring vertices of the clothing pattern(s) P near the sewing boundary.

In some embodiments, the processing device 130 may perform operation 508 on the aligned clothing pattern(s) first to remove cloth-body intersection, and then perform operation 509 on the processed aligned clothing pattern(s) after cloth-body intersection removal to remove self-intersections. In such cases, the phased approach for arranging the selected clothing pattern(s) includes three steps, the first step for initial alignment using the target optimization function, the second step for cloth-body intersection removal using the first updated optimization function added with the first optimization term (i.e., the body repulsion potential), the third step for self-intersection removal using the second updated optimization function added with the second optimization term (i.e., the self-repulsion potential).

FIG. 9b shows a selected sleeve clothing pattern after affine transformation. FIG. 9c shows an aligned sleeve clothing pattern after initial alignment. FIG. 9e shows a processed sleeve clothing pattern after cloth-body intersection removal. FIG. 9f shows an arranged sleeve clothing pattern after self-intersection removal. It is clearly shown in those figures that the phased approach for arranging the selected clothing pattern(s) has a high arrangement accuracy and can reduce or eliminate the local minima issues as shown in FIG. 9a and FIG. 9d.

In some embodiments, the processed clothing pattern(s) after cloth-body intersection removal and self-intersection removal may be regarded as the refined clothing pattern(s) and designated as the arranged clothing pattern(s), then the processing device 130 may perform a next iteration.

In some alternative embodiments, before designating the refined clothing pattern(s) as the arranged clothing pattern(s), the processing device 130 may further perform operation 510 to determine whether the refined clothing pattern(s) satisfy at least one termination condition. In response to determining that the refined clothing pattern(s) satisfy the at least one termination condition, the processing device 130 may designate the refined clothing pattern(s) as the arranged clothing pattern(s). In response to determining that the refined clothing pattern(s) do not satisfy the at least one termination condition, the processing device 130 may repeat the clothing pattern arrangement process to rearrange the selected clothing pattern(s), or update the selected clothing pattern(s) processed in the iteration and repeat the clothing pattern arrangement process to arrange the updated selected clothing pattern(s).

The termination condition may be used to assess the quality of the arrangement. In some embodiments, one or more evaluation parameters may be determined, and whether the termination condition is satisfied may be determined based on the evaluation parameter(s). For example, the evaluation parameter(s) include an evaluation parameter B for evaluating whether a clothing pattern has been excessively folded, an evaluation parameter $\theta_{out}$ for evaluating whether two adjacent clothing patterns have been excessively folded along their boundary, and an evaluation parameter $s_{max}$ for evaluating whether there is significant stretching of any spring edge. $\theta_{in}$, $\theta_{out}$, and $s_{max}$ may be determined according to Equations (13)-(15), respectively, as below:

$$\theta_{in} = \min_{\{t_0, t_1\} \in N} n(t_0) \cdot n(t_1), \quad (13)$$

-continued $$\theta_{out} = \min_{\{t_0, t_1\} \in B} n(t_0) \cdot n(t_1), \quad (14)$$

$$s_{max} = \max_{\{i, j\} \in \varepsilon} (\|x_i - x_j\| - L_{ij}^0), \quad (15)$$

where $t_0$ is a triangle including vertices of the selected clothing pattern(s) P in the iteration, $t_1$ refers to a triangle including vertices of the already arranged clothing pattern(s) $\overline{P}$, n(t) is the normal of a triangle t, N is the set of neighboring triangles between the clothing pattern(s) P and the clothing pattern(s) $\overline{P}$, and B is the set of boundary triangles adjacent to each other after sewing.

Figure 10B:
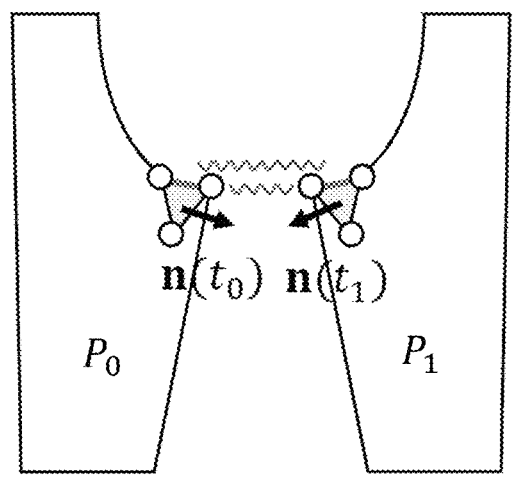

In some embodiments, the termination condition may include that $\theta_{in}$ is not smaller than a threshold $\theta_{in}^0$, that $\theta_{out}$ is not smaller than a threshold $\theta_{out}^0$, and that $s_{max}$ is not greater than a threshold $s_{max}^0$. If $\theta_{in} < \theta_{in}^0$, it suggests the clothing pattern(s) P are folded or intersected, the processing device 130 may determine that the termination condition is not satisfied, and repeat the entire arrangement process until the clothing pattern(s) P are flattened. If $\theta_{out} < \theta_{out}^0$, it may indicate that two adjacent clothing patterns have been excessively folded along their boundary as observed in scenarios such as the crotch formed by leg clothing patterns in FIG. 10b, the processing device 130 may determine that the termination condition is not satisfied, and repeat the entire arrangement process. If $s_{max} > s_{max}^0$, it implies the clothing pattern(s) P have been overly stretched due to cloth-body intersections. This issue may result from insufficient clothing pattern selection or the arrangement process itself. The processing device 130 may repeat the arrangement process. Alternatively, the processing device 130 may add the neighboring clothing patterns of the currently selected clothing pattern(s) into the selected clothing pattern set, and then repeat the arrangement process for the newly selected clothing pattern(s).

After the termination condition is satisfied, the processing device 130 may perform operation 511 to determine whether all the clothing patterns have been processed. If all the clothing patterns have been processed, the processing device 130 may perform operation 512 for garment generation. If not, the processing device 130 may perform the next iteration.

The computational cost of the arrangement process relies on the number of iterations spent by the solver at each step, and the initial alignment step is of particular importance to the final arrangement quality. In some embodiments, since most clothing pattern(s) can be arranged during the first arrangement with a few initial alignment iterations, the number of initial alignment iterations may be reduced for less cost. For example, 2,000 iterations may be spent by the solver when operation 506 is performed first time, 20,000 iterations may be spent by the solver when operation 506 is performed repeatedly.

FIG. 6 is a schematic diagram illustrating an exemplary process 600 for determining a body part corresponding to a clothing pattern according to some embodiments of the present disclosure.

In the first iteration, the processing device 130 may perform process 600 for each clothing pattern to determine the body part corresponding to the clothing pattern.

As shown in FIG. 6, the processing device 130 may determine position feature information 603 of a clothing pattern based on the sewing relationship 601 between the clothing pattern and its neighboring clothing pattern. The processing device 130 may further determine the body part 605 corresponding to the clothing pattern by processing the position feature information 603 using a body part determination model 604, the body part determination model being a trained machine learning model.

The position feature information 603 may relate to the position of the clothing pattern relative to its neighboring clothing pattern. In some embodiments, the position feature information 603 may indicate whether the clothing pattern is located above its neighboring clothing pattern. Since clothing pattern(s) corresponding to the neck or the waist are located above their neighboring clothing patterns, the position feature information 603 may be used to accurately identify the clothing pattern(s) corresponding to the neck or the waist.

Merely by way of example, the position feature information 603 of a clothing pattern P may indicate the position of the clothing pattern P relative to its neighboring clothing pattern P', and be determined based on the sewing relationship between the clothing pattern P and the clothing pattern P' according to Equation (16) below:

$$S_{P \rightarrow P'} = \sum_{e' \in \partial P'} C(e', P)U(e'), \quad (16)$$

where $S_P \rightarrow p'$ refers to the position feature information 603 indicating the position of the clothing pattern P relative to the clothing pattern P', $\partial P'$ refers to a set of sewing boundaries of the clothing pattern P', e' is an edge of the clothing pattern P' belonging to $\partial P'$, U(e') is the column area of the clothing pattern P' under edge e', and C(X,Y) is a function testing if two edges X and Y are connected by any sewing line S. Referring to FIG. 7a, the column area of the clothing pattern P' under the edge e' is the area of the grey region in the clothing pattern P' under the edge e'. C(X, Y) may be determined according to Equation (17) below:

$$C(X, Y) = \begin{cases} 1, \exists x \in X, y \in Y, \{x, y\} \in S \\ 0, \text{otherwise} \end{cases} \quad (17)$$

When $S_{p \rightarrow p'}$ is large, it suggests that P is above P' on the digital garment and P is likely be to a neck or waist clothing pattern. By using the position feature information 603 determined based on Equation (16), clothing patterns corresponding to the neck or the waist can be identified accurately and efficiently. In addition, Equation (16) can be reused later for the clothing pattern selection in other iterations as described in connection with operation 504.

The body part determination model 604 refers to a trained machine learning model used to determine a body part corresponding to a clothing pattern based on its input. For example, the position feature information 603 may be input into the body part determination model 604, and the body part determination model 604 may output a probability of the clothing pattern belonging to each body part category. Then the processing device 130 may determine the body part 605 of the clothing pattern based on the output of the body part determination model 604.

In some embodiments, as shown in FIG. 6, the input of the body part determination model 604 further includes shape feature information 602 of the clothing pattern. The shape feature information 602 may include shape feature(s), such as the size, the length, the width, etc., of the clothing pattern. In some embodiments, the shape feature(s) may be defined by radial sampling.

The shape feature of the clothing pattern alone is insufficient for determining the body part, as many clothing patterns share similar shapes but correspond to different body parts. Therefore, in some embodiments, the shape feature information 602 may further include shape features of the neighboring clothing pattern of the clothing pattern.

When the clothing pattern has multiple neighboring clothing patterns, the shape feature information 602 may include shape features of each neighboring clothing pattern, and the position feature information 603 may include position feature information of each neighboring clothing pattern.

In some embodiments, the body part determination model 604 may be a classification model. For example, the body part determination model 604 is a two-layer graph attention network, which includes a first layer and a second layer connected to the first layer. The first layer aggregates the features of the clothing pattern and its neighboring clothing pattern, including both shape feature information 602 and position feature information 603, using an attention mechanism. The second layer acts as a classifier with softmax activation to predict the probability of the clothing pattern belonging to each body part category.

The body part determination model 604 may be trained by the processing device 130 or another processing device 130. For example, the processing device 130 may train a preliminary model using training samples, each of which includes sample shape feature information and/or sample position feature information of a sample clothing pattern, and a training label indicating the body part corresponding to the sample clothing pattern. In some embodiments, the preliminary model may be trained using an AdamW optimizer. The initial learning rate may be set to $5\times10^{-5}$, the backbone may be set to $5\times10^{-6}$, and the weight decay may be set to $10^{-4}$.

The present disclosure also provides systems or methods for arranging clothing pattern(s) based on first clothing pattern(s) that have been arranged on the 3D avatar. Specifically, sewing relationships between the one or more first clothing patterns and one or more clothing patterns may be determined, wherein the one or more clothing patterns need to be arranged on the 3D avatar. The first clothing pattern(s) and the clothing patterns may be clothing patterns to be transformed into a digital garment. The first clothing patterns may include clothing pattern(s) that have been arranged in previous iteration(s), or arranged manually by a user, or by any other suitable manner. The one or more clothing patterns may be aligned to the one or more first clothing patterns based on the sewing relationships to generate one or more aligned clothing patterns. Intersection removal may be performed on the one or more aligned clothing patterns to determine one or more refined clothing patterns, and the one or more clothing patterns may be arranged to warp around the 3D avatar based on the one or more refined clothing patterns. More descriptions regarding the arrangement process may be found elsewhere in the present disclosure. See, e.g., FIG. 5 and relevant descriptions thereof.

EXAMPLES

The systems of the present disclosure were implemented using a solver based on the parallelized gradient descent method with Jacobi preconditioning and Chebyshev acceleration, utilizing a fixed step size (with $\alpha=0.4$) and a fixed spectral radius (with $\rho=0.9994$). The performance of the systems was evaluated using 21 clothing patterns designed for six body types. These clothing patterns encompass various garment types, including pants, dresses, coats, and shirts. Depending on the pattern design, the number of vertices (after resampling) ranges from 1.5K to 23K, and the number of clothing patterns varies from 7 to 358. On average, each clothing pattern includes 197 vertices, and about 52 percent of the clothing patterns contain 100 vertices or fewer.

Figure 11A:
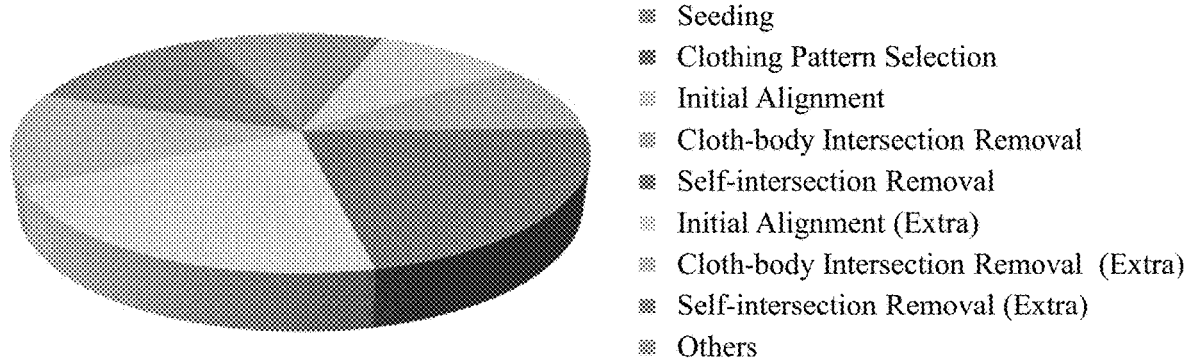
FIGS. 11a-11c illustrates evaluation results of the system of the present disclosure.

The efficiency of the systems was evaluated on a workstation with an Intel® Core™ i9-13900K 3.00 GHz CPU. FIG. 11a provides a breakdown of the computational time dedicated to the puff-sleeve dress example. Among the processes involved, the initial arrangement step is the most expensive one. Further analysis within it reveals that the self-body removal step contributes the most to the cost.

Figure 11B:
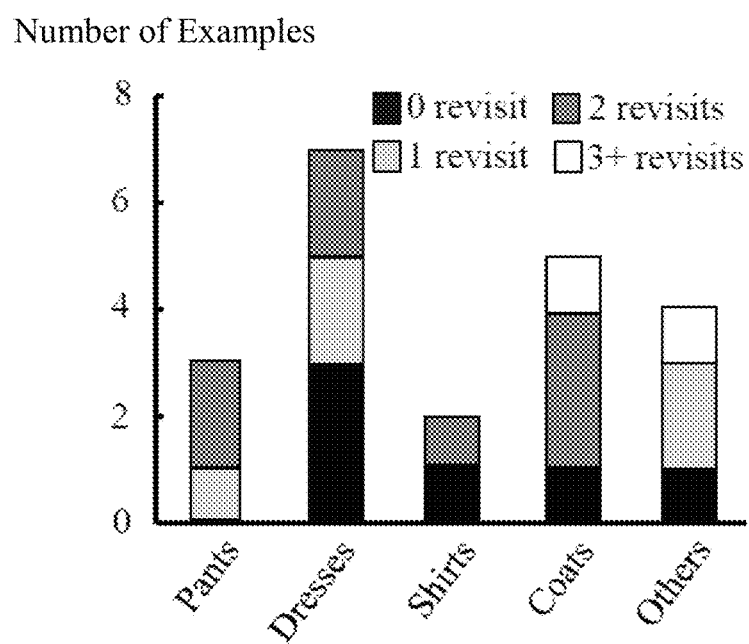
Figure 11C:
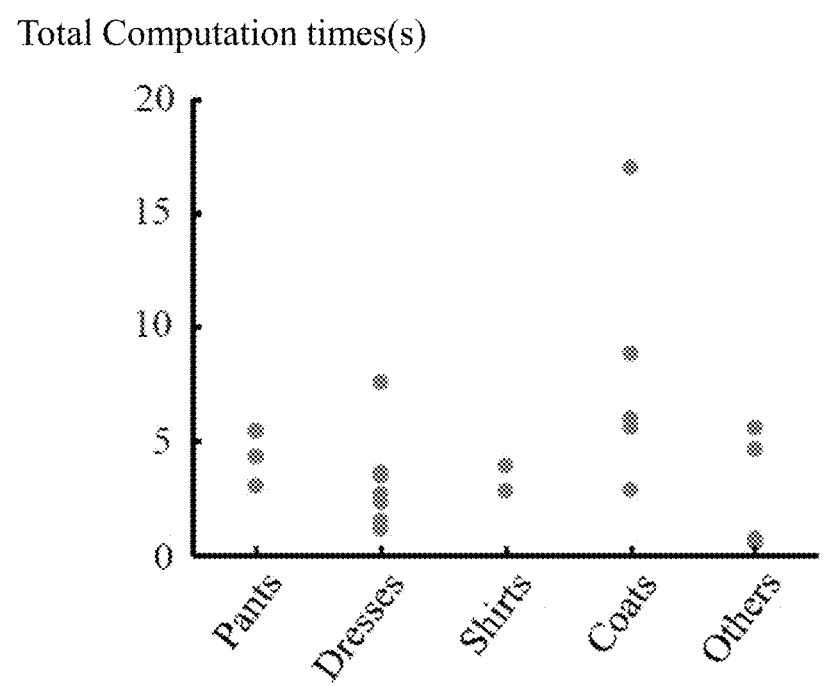

According to operation 510, if the first pass fails to meet the termination condition, the systems revisit the clothing pattern arrangement process and increase the number of iterations. FIG. 11a illustrates that this practice nearly doubles the computational cost when the systems revisit the process twice in this example. Fortunately, our experiments, summarized in FIG. 11b, show that 52 percent of the examples require zero or one revisit, and only 10 percent of the examples need more than two revisits. Consequently, our systems can process the majority of the examples within 10 seconds as FIG. 11c shows. FIGS. 11b and 11c establish a clear correlation between the number of revisits and the computational time. It also highlights the systems' efficiency, showing high variability when processing dresses and coats.

In some embodiments, the processes 400, 500, and 600 may be implemented by the processing device 130 of the fashion design system 100 illustrated in FIG. 1. For example, the process 400 may be stored in a storage (e.g., the storage device 140) as a form of instructions, and invoked and/or executed by a processor of the processing device 130. The operations of the illustrated process presented below are intended to be illustrative. In some embodiments, the processes 400, 500, and 600 may be accomplished with one or more additional operations not described, and/or without one or more of the operations discussed. Additionally, the order in which the operations of the 400, 500, and 600 as illustrated in figures and described below is not intended to be limiting.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an subject oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., +1%, +5%, +10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification or determination is provided for illustration purposes and modified according to different situations. For example, a classification condition that "a value is greater than the threshold value" may further include or exclude a condition that "the probability value is equal to the threshold value."

What is claimed is:

1. A method for arranging clothing patterns implemented on a computing device having at least one processor and at least one storage device, the method comprising:

determining sewing relationships between clothing patterns to be transformed into a digital garment on a 3D avatar;

performing iterations to process the clothing patterns, each of the iterations comprising:

selecting one or more clothing patterns to be processed in the iteration from the clothing patterns based on the sewing relationships; and arranging the one or more clothing patterns to warp around the 3D avatar; and generating the digital garment that is worn on the 3D avatar by sewing the arranged clothing patterns corresponding to the iterations based on the sewing relationships, wherein in the first iteration of the iterations, the one or more clothing patterns to be processed are selected from the clothing patterns based on the sewing relationships and correspond to one or more target body parts, in an iteration other than the first iteration, the one or more clothing patterns to be processed are selected from second clothing patterns that have not been processed based on the sewing relationships and have a total number of vertices smaller than a number threshold.

2. The method of claim 1, wherein in the first iteration of the iterations, the one or more clothing patterns to be processed are determined by:
- for each of the clothing patterns, determining a body part corresponding to the clothing pattern based on the sewing relationships of the clothing pattern;
- selecting, from the clothing patterns, the one or more clothing patterns corresponding to the one or more target body parts based on the body part corresponding to each clothing pattern; and
- determining the one or more selected clothing patterns corresponding to the one or more target body parts as the one or more clothing patterns to be processed in the first iteration.

3. The method of claim 2, wherein for each of the clothing patterns, the determining a body part corresponding to the clothing pattern based on the sewing relationships of the clothing pattern comprises:
- for each of the clothing pattern,
    - determining position feature information relating to the position of the clothing pattern relative to its neighboring clothing pattern based on the sewing relationship between the clothing pattern and its neighboring clothing pattern; and
    - determining the body part corresponding to the clothing pattern by processing the position feature information using a body part determination model, the body part determination model being a trained machine learning model.

4. The method of claim 1, wherein in an iteration other than the first iteration of the iterations, the one or more clothing patterns to be processed are determined by:
- determining, from the clothing patterns, one or more first clothing patterns that have been processed and the second clothing patterns that have not been processed;
- for each second clothing pattern, determining a recommendation score of the second clothing pattern based on the sewing relationships between the second clothing pattern and the one or more first clothing patterns; and
- determining the one or more clothing patterns from the second clothing patterns based on the recommendation score of each second clothing pattern.

5. The method of claim 4, wherein the determining the one or more clothing patterns from the one or more second clothing patterns based on the recommendation score of each second clothing pattern comprises:
- selecting target clothing patterns from the second clothing patterns, each target clothing pattern having a recommendation score higher than a score threshold, and the total number of vertices of the target clothing patterns being smaller than the number threshold; and
- designating the target clothing patterns as the one or more clothing patterns.

6. The method of claim 4, wherein the recommendation score of each second clothing pattern is associated with at least one of the length of edges of the second clothing pattern that are connected to the one or more first clothing patterns via sewing lines, the area of the second clothing pattern, or the position of the second clothing pattern relative to the one or more first clothing patterns.

7. The method of claim 1, wherein in an iteration other than the first iteration of the iterations, the one or more clothing patterns to be processed are determined by:
- determining, from the clothing patterns, one or more first clothing patterns that have been processed and the second clothing patterns that have not been processed;
- determining one or more pattern sets based on the sewing relationships between the second clothing patterns and the one or more first clothing patterns, each pattern set including second clothing patterns whose sewing boundaries are connected on the one or more first clothing patterns;
- for each of the one or more pattern sets, combining the second clothing patterns in the pattern set into a single combined clothing pattern; and
- determining the one or more clothing patterns based on a recommendation score and/or number of vertices of each combined clothing pattern.

8. The method of claim 1, wherein in an iteration other than the first iteration of the iterations, the arranging the one or more clothing patterns to warp around the 3D avatar comprises:
- aligning the one or more clothing patterns to one or more first clothing patterns that have been processed based on the sewing relationships between the one or more clothing patterns and the one or more first clothing patterns;
- performing intersection removal on the one or more aligned clothing patterns to determine one or more refined clothing patterns; and
- determining the one or more arranged clothing patterns based on the one or more refined clothing patterns.

9. The method of claim 8, wherein the aligning the one or more clothing patterns to one or more first clothing patterns that have been processed comprises:
- determining one or more sewing pairs based on the sewing relationships between the one or more clothing patterns and the one or more first clothing patterns, each sewing pair including a first vertex of the one or more clothing patterns and a corresponding second vertex of the one or more first clothing patterns;
- determining one or more transformed clothing patterns by applying, based on an arranged position of the second vertex of each sewing pair, affine transformation on the one or more clothing patterns to minimize a sewing gap between the one or more clothing patterns and the one or more first clothing patterns;
- determining the one or more aligned clothing patterns by solving a target optimization function based on the arranged position of the second vertex of each sewing pair and the one or more transformed clothing patterns.

10. The method of claim 9, wherein the performing intersection removal includes removing cloth-body intersection between the one or more aligned clothing patterns and the 3D avatar by:
- dividing vertices of the one or more aligned clothing patterns into multiple sets based on positions of the vertices relative to a sewing boundary of the one or more aligned clothing patterns;
- sequentially processing the multiple sets by solving a first updated optimization function, the first updated optimization function including the target optimization function and a first optimization term relating to distances between vertices and the 3D avatar.

11. The method of claim 9, wherein the performing intersection removal includes removing self-intersection of the one or more aligned clothing patterns by:
- for each vertex of the one or more aligned clothing patterns, determining a reference triangle including vertices of the one or more first clothing patterns;
- removing self-intersection of the one or more aligned clothing patterns by solving a second updated optimization function, the second updated optimization function including the target optimization function and a second optimization term relating to a position of each vertex of the one or more aligned clothing patterns relative to its reference triangle.

12. The method of claim 8, wherein the determining the one or more arranged clothing patterns based on the one or more refined clothing patterns comprises:

determining whether the one or more refined clothing patterns satisfy at least one termination condition;

in response to determining that the one or more refined clothing patterns satisfy the at least one termination condition, designating the one or more refined clothing patterns as the one or more arranged clothing patterns;

or in response to determining that the one or more refined clothing patterns do not satisfy the at least one termination condition, rearranging the one or more clothing patterns or updating the one or more clothing patterns processed in the iteration.

13. A method for arranging clothing patterns implemented on a computing device having at least one processor and at least one storage device, the method comprising:

determining sewing relationships between one or more first clothing patterns and one or more clothing patterns, wherein the one or more first clothing patterns have been arranged on a 3D avatar, and the one or more clothing patterns need to be arranged on the 3D avatar;

aligning the one or more clothing patterns to the one or more first clothing patterns based on the sewing relationships to generate one or more aligned clothing patterns;

performing intersection removal on the one or more aligned clothing patterns to determine one or more refined clothing patterns; and arranging the one or more clothing patterns to warp around the 3D avatar based on the one or more refined clothing patterns, wherein the one or more clothing patterns are selected from second clothing patterns that have not been processed by:

for each second clothing pattern, determining a recommendation score of the second clothing pattern based on the sewing relationships between the second clothing pattern and the one or more first clothing patterns;

selecting target clothing patterns from the second clothing patterns, each target clothing pattern having a recommendation score higher than a score threshold, and a total number of vertices of the target clothing patterns being smaller than a number threshold; and designating the target clothing patterns as the one or more clothing patterns.

14. The method of claim 13, wherein the aligning the one or more clothing patterns to one or more first clothing patterns comprises:

determining one or more sewing pairs based on the sewing relationships between the one or more clothing patterns and the one or more first clothing patterns, each sewing pair including a first vertex of the one or more clothing patterns and a corresponding second vertex of the one or more first clothing patterns;

determining one or more transformed clothing patterns by applying, based on an arranged position of the second vertex of each sewing pair, affine transformation on the one or more clothing patterns to minimize a sewing gap between the one or more clothing patterns and the one or more first clothing patterns;

determining the one or more aligned clothing patterns by solving a target optimization function based on the arranged position of the second vertex of each sewing pair and the one or more transformed clothing patterns.

15. The method of claim 14, wherein the performing intersection removal includes removing cloth-body intersection between the one or more aligned clothing patterns and the 3D avatar by:

dividing vertices of the one or more aligned clothing patterns into multiple sets based on positions of the vertices relative to a sewing boundary of the one or more aligned clothing patterns;

sequentially processing the multiple sets by solving a first updated optimization function, the first updated optimization function including the target optimization function and a first optimization term relating to distances between vertices and the 3D avatar.

16. The method of claim 14, wherein the performing intersection removal includes removing self-intersection of the one or more aligned clothing patterns by:

for each vertex of the one or more aligned clothing patterns, determining a reference triangle including vertices of the one or more first clothing patterns;

removing self-intersection of the one or more aligned clothing patterns by solving a second updated optimization function, the second updated optimization function including the target optimization function and a second optimization term relating to a position of each vertex of the one or more aligned clothing patterns relative to its reference triangle.

17. The method of claim 13, wherein the arranging the one or more clothing patterns to warp around the 3D avatar based on the one or more refined clothing patterns comprises:

determining whether the one or more refined clothing patterns satisfy at least one termination condition;

in response to determining that the one or more refined clothing patterns satisfy the at least one termination condition, designating the one or more refined clothing patterns as the one or more arranged clothing patterns;

or in response to determining that the one or more refined clothing patterns do not satisfy the at least one termination condition, rearranging the one or more clothing patterns or updating the one or more clothing patterns.

18. The method of claim 13, wherein the one or more clothing patterns are selected from multiple clothing patterns to be transformed into a digital garment on the 3D avatar by:

determining, from the clothing patterns, the one or more first clothing patterns that have been processed and the second clothing patterns that have not been processed;

determining one or more pattern sets based on the sewing relationships between the second clothing patterns and the one or more first clothing patterns, each pattern set including second clothing patterns whose sewing boundaries are connected on the one or more first clothing patterns; and determining the one or more clothing patterns based on the one or more pattern sets.

19. A system, comprising:

at least one storage device storing a set of instructions for arranging clothing patterns; and at least one processor configured to communicate with the at least one storage device, wherein when executing the set of instructions, the at least one processor is configured to direct the system to perform operations including:

determining sewing relationships between clothing patterns to be transformed into a digital garment on a 3D avatar;

performing iterations to process the clothing patterns, each of the iterations comprising:

selecting one or more clothing patterns to be processed in the iteration from the clothing patterns based on the sewing relationships; and arranging the one or more clothing patterns to warp around the 3D avatar; and generating the digital garment that is worn on the 3D avatar by sewing the arranged clothing patterns corresponding to the iterations based on the sewing relationships, wherein in an iteration other than the first iteration, the one or more clothing patterns to be processed are selected from second clothing patterns that have not been processed based on the sewing relationships, a recommendation score of each of the one or more clothing patterns to be processed is greater than a score threshold, and a total number of vertices of the one or more clothing patterns is smaller than a number threshold.

\* \* \* \* \*